US012389454B2

(12) United States Patent
Yang et al.

(10) Patent No.: US 12,389,454 B2
(45) Date of Patent: Aug. 12, 2025

(54) CHANNEL PUNCTURE MODE INDICATION METHOD AND RELATED APPARATUS

(71) Applicant: Huawei Technologies Co., Ltd., Shenzhen (CN)

(72) Inventors: Mao Yang, Xi'an (CN); Zhongjiang Yan, Xi'an (CN); Yiqing Li, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 17/966,046

(22) Filed: Oct. 14, 2022

(65) Prior Publication Data
US 2023/0039547 A1    Feb. 9, 2023

Related U.S. Application Data

(63) Continuation of application No. PCT/CN2021/085948, filed on Apr. 8, 2021.

(30) Foreign Application Priority Data

Apr. 17, 2020  (CN) .......................... 202010309743.2

(51) Int. Cl.
*H04W 74/0816*    (2024.01)
*H04L 1/00*    (2006.01)
(52) U.S. Cl.
CPC ....... *H04W 74/0816* (2013.01); *H04L 1/0013* (2013.01)

(58) Field of Classification Search
CPC .. H04W 74/0816; H04W 74/006; H04L 1/00; H04L 1/0013; H04L 5/0044; H04L 5/0053
See application file for complete search history.

(56) References Cited

U.S. PATENT DOCUMENTS 10,973,051 B2 * 4/2021 Lou ................. H04W 74/0816
2018/0092127 A1 3/2018 Park
(Continued)

FOREIGN PATENT DOCUMENTS

CN    104994586 A    10/2015
CN    107409033 A    11/2017
(Continued)

OTHER PUBLICATIONS

Chu, L., et al., "BW Negotiation, TXOP Protection with >160MHz PPDU and Puncture Operation", date Jan. 6, 2020, Doc.: IEEE 802.11-20/0062r0, Jan. 6, 2020, 10 Pages.
(Continued)

*Primary Examiner* — Yemane Mesfin
*Assistant Examiner* — Jia Hao Deng
(74) *Attorney, Agent, or Firm* — Slater Matsil, LLP

(57) ABSTRACT

Embodiments of this application disclose a channel puncture mode indication method and a related apparatus, which are applied to a wireless local area network (WLAN) system, for example, a WLAN system supporting 802.11be. The method includes: An access point sends a multi-user request to send MU-RTS frame, where the MU-RTS frame includes a common information field, the common information field includes channel puncture information, and the channel puncture information indicates whether at least one 20 MHz channel is occupied.

16 Claims, 14 Drawing Sheets

(56) References Cited

U.S. PATENT DOCUMENTS

2020/0112910 A1* 4/2020 Cherian ............ H04W 72/0446
2023/0130569 A1* 4/2023 Kim ...................... H04L 5/0092
370/329

FOREIGN PATENT DOCUMENTS

| | | | |
|---|---|---|---|
| CN | 107534972 | A | 1/2018 |
| CN | 108400858 | A | 8/2018 |
| CN | 108476530 | A | 8/2018 |
| CN | 110730050 | A | 1/2020 |
| WO | 2020010332 | A1 | 1/2020 |

OTHER PUBLICATIONS

"Part 11: Wireless LAN Medium Access Control (MAC) and Physical Layer (PHY) Specifications", Amendment 4:Enhancements for Very High Throughput for Operation in Bands below 6 Ghz, IEEE Standard for Information technology—Telecommunications and information exchange between systems, Local and metropolitan area networks—Specific requirements, IEEE Computer Society, IEEE Std 802.11ac™-2013, (Amendment to IEEE Std 802.11™-2012, as amended by IEEE Std 802.11ae™-2012, IEEE Std 802.11aa™-2012,and IEEE Std 802.11ad™-2012), Approved.
"Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, IEEE P802.11ax™/D6.0, Nov. 2019, (amendment to IEEE P802.11REVmd/D3.0), 780 Pages.
Seok, Y., et al., "EHT RTS and CTS Procedure", date Mar. 13, 2020, doc.: IEEE 802.11-19/2125r1, Jan. 2020, 17 Pages.

* cited by examiner

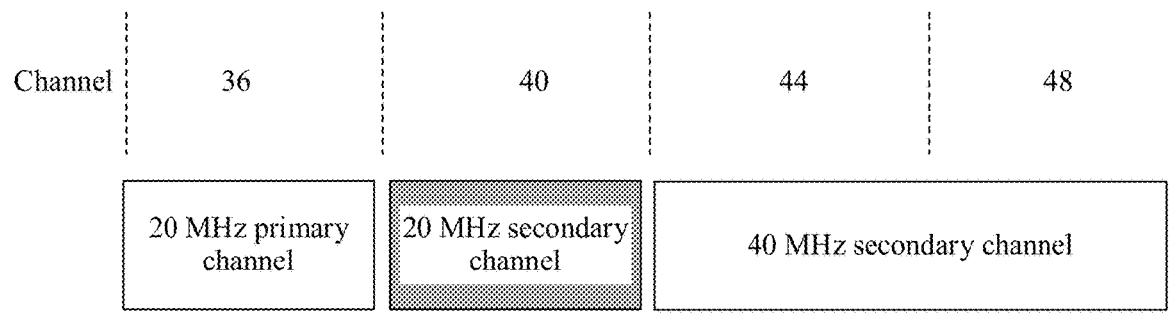
FIG. 3
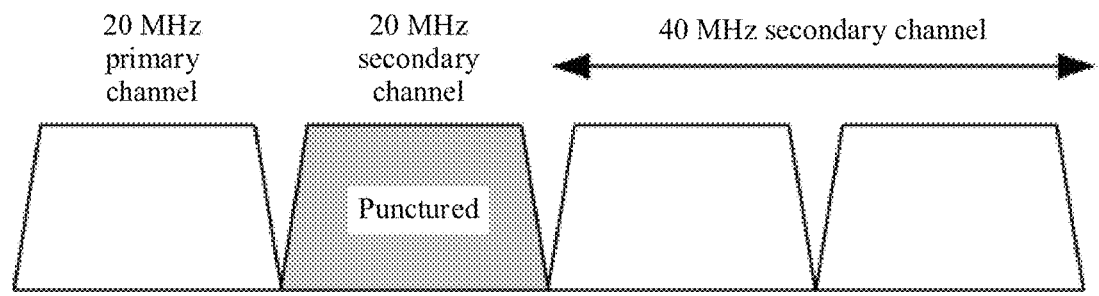
FIG. 4
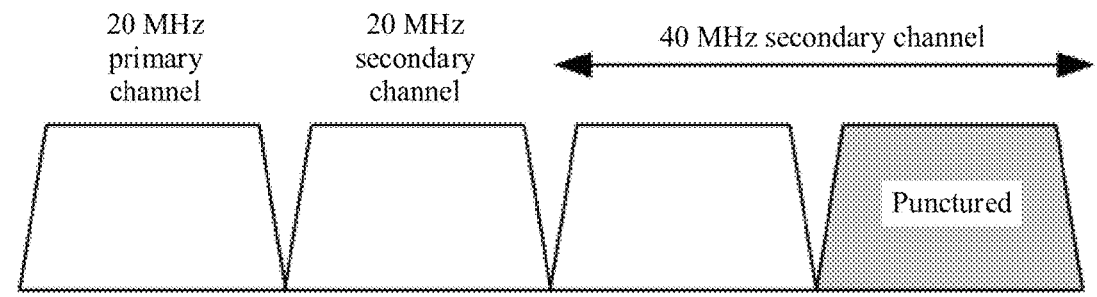
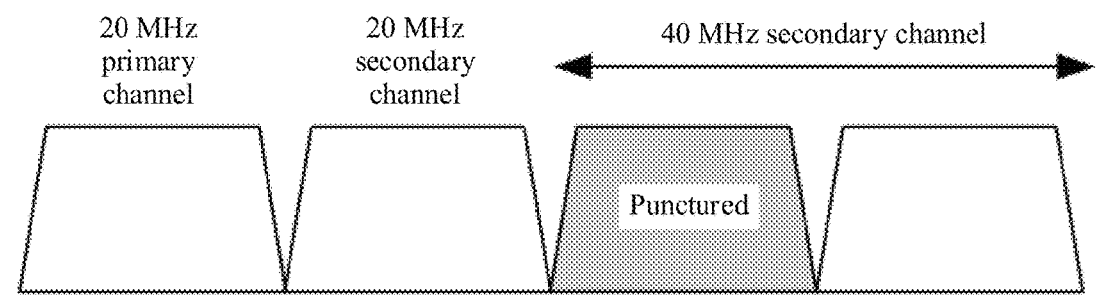
FIG. 5

| Trigger type | Uplink length | More trigger frame | Channel status required | Uplink bandwidth | GI and HE-LTF type | MU-MIMO HE-LTF type | Number of HE-LTF symbols and midamble periodicity |
|---|---|---|---|---|---|---|---|
| B0 B3 | B4 B15 | B16 | B17 | B18 B19 B20 | B21 | B22 | B23 B25 |

Common information field

| Uplink space time block coding | LDPC extra symbol segment | AP transmit power | Pre-FEC padding factor | PE disambiguity | Uplink spatial reuse | Doppler | Uplink HE-SIG-A2 | Reserved |
|---|---|---|---|---|---|---|---|---|
| B26 | B27 | B28 B33 | B34 B35 | B36 | B37 B52 | B53 | B54 B62 | B63 |

FIG. 10

| Trigger type | ... | Uplink spatial reuse and channel indication | ... |
|---|---|---|---|

FIG. 11 (A)

| Trigger type | ... | AP transmit power and puncture type | ... |
|---|---|---|---|

FIG. 11 (B)

| Trigger type | ... | EHT channel indication | ... |
|---|---|---|---|

FIG. 12 (A)

| Trigger type | ... | EHT puncture type | ... |
|---|---|---|---|

FIG. 12 (B)

| Trigger type | ... | Uplink high efficiency signal reserved and EHT uplink bandwidth | ... |
|---|---|---|---|

FIG. 13 (A)

| Trigger type | ... | EHT uplink bandwidth | ... |
|---|---|---|---|

FIG. 13 (B)

| Trigger type | ... | Doppler and EHT uplink bandwidth indication | Uplink HE-SIG-A2 reserved and additional bandwidth for EHT | ... |
|---|---|---|---|---|

FIG. 14

CHANNEL PUNCTURE MODE INDICATION METHOD AND RELATED APPARATUS

CROSS-REFERENCE TO RELATED APPLICATIONS

This application is a continuation of International Application No. PCT/CN2021/085948, filed on Apr. 8, 2021, which claims priority to Chinese Patent Application No. 202010309743.2, filed on Apr. 17, 2020. The disclosure of the aforementioned applications is hereby incorporated by reference in their entireties.

TECHNICAL FIELD

This application relates to the field of network communication technologies, and in particular, to a channel puncture mode indication method and a related apparatus.

BACKGROUND

A wireless communication technology increases a spectrum width, to effectively improve a transmission rate of a channel. In a wireless local area network (WLAN) transmission environment, to avoid a signal collision, before transmission starts, an access point (AP) and a station (STA) may protect a period of time through frame interaction of a request to send (RTS) frame and a clear to send (CTS) frame, so that interference from another access point or station is avoided during the period of time. In an 802.11ax standard, multi-user transmission is widely applied. Each time before multi-user transmission is performed, the AP needs to interact with each station through an RTS/CTS frame to perform channel protection. This results in high signaling overheads. Therefore, the 802.11ax standard proposes an MU-RTS mechanism. The AP may simultaneously interact with a plurality of stations through an MU-RTS/CTS frame to complete channel protection. This greatly improves system efficiency.

With evolution and development of wireless local area network (WLAN) communication standards from 802.11a and 802.14 to 802.1 in, 802.11ac, 802.11ax (also referred to as WiFi 6 or Wi-Fi 6), and the like, an allowed transmission bandwidth also gradually changes. A transmission bandwidth allowed by the 802.11a or 802.11g standard is 20 MHz. A transmission bandwidth allowed by the 802.11n standard is 20 MHz or 40 MHz. A transmission bandwidth allowed by the 802.11ax standard is 20 MHz, 40 MHz, 80 MHz, or 160 MHz. A WLAN system expects to implement a higher transmission rate by using a larger bandwidth. A next-generation standard IEEE 802.11be (also referred to as WiFi 7 or Wi-Fi 7) is referred to as an extremely high throughput (EHT), and has a most important technical objective of significantly improving a peak throughput. A supported bandwidth is expanded from 160 MHz in IEEE 802.11ax to 320 MHz, to further increase a transmission rate.

Because the bandwidth is expanded from 160 MHz to 320 MHz, as denser users access channels, more busy channels are caused, and channel fragmentation is more likely to occur. When an MU-RTS frame in 802.11ax is used for channel protection, problems of inflexible channel protection and low channel usage may exist. Therefore, in a next-generation 802.11 protocol, for example, 802.11be, how to improve channel protection flexibility and channel usage is a critical problem.

SUMMARY

Embodiments of this application provide a channel puncture mode indication method and a related apparatus, to improve channel protection flexibility and frequency domain resource usage.

According to a first aspect, an embodiment of this application provides a channel puncture mode indication method. The method includes: An access point generates a multi-user request to send MU-RTS frame, where the MU-RTS frame includes a common information field, and the common information field includes channel puncture information; and the access point sends the MU-RTS frame to a station, where the channel puncture information indicates whether at least one 20 MHz channel is occupied.

The channel puncture information carried by the common information field indicates channel occupancy in a preamble puncture mode, so that a discontinuous channel, for example, a secondary channel, can be protected, and a secondary channel in an idle state can be effectively used. This improves channel protection flexibility and channel resource usage. If the channel puncture information is carried by a user information field of a trigger frame, because each user corresponds to one user information field, a plurality of user information fields of the trigger frame carry same type of information. This results in high signaling overheads. If the channel puncture information is carried by the common information field of the trigger frame, different stations may learn channel occupancy from the common information field. This reduces signaling overheads.

According to a second aspect, an embodiment of this application provides a channel puncture mode indication method. The method includes: A station receives a multi-user request to send MU-RTS frame from an access point, where the MU-RTS frame includes a common information field, the common information field includes channel puncture information, and the channel puncture information indicates whether at least one 20 MHz channel is occupied; and the station sends a clear to send CTS frame to the access point based on the channel puncture information.

The channel puncture information carried by the common information field indicates channel occupancy in a preamble puncture mode, so that a discontinuous channel, for example, a secondary channel, can be protected, and the secondary channel in an idle state can be effectively used. This improves channel protection flexibility, channel usage, and spectrum efficiency. If the channel puncture information is carried by a user information field of a trigger frame, because each user corresponds to one user information field, a plurality of user information fields of the trigger frame carry same type of information. This results in high signaling overheads. If the channel puncture information is carried by the common information field of the trigger frame, different stations may learn channel occupancy from the common information field. This reduces signaling overheads.

In a possible design of the first aspect or the second aspect, the channel puncture information is a bitmap. The bitmap includes at least one bit. One bit corresponds to one 20 MHz channel. The bit indicates whether the 20 MHz channel is occupied. The bitmap indicates whether the at least one 20 MHz channel is occupied, and the bitmap is carried by the common information field. This reduces signaling overheads.

In another possible design of the first aspect or the second aspect, the channel puncture information includes a plurality of bits. One value of the plurality of bits indicates at least one type of occupancy of the at least one 20 MHz channel. The plurality of bits indicate a puncture type, and the plurality of bits are carried by the common information field. This reduces signaling overheads.

In another possible design of the first aspect or the second aspect, the channel puncture information is carried by a reserved field of the common information field, for example, an uplink spatial reuse field or a transmit power field. An existing MU-RTS frame structure is reused, so that compatibility is good and implementation is simple. In addition, the reserved field carries the channel puncture information, so that no additional bit needs to be added. This reduces signaling overheads.

In another possible design of the first aspect or the second aspect, the common information field further includes bandwidth information. The bandwidth information indicates a bandwidth of a physical layer protocol data unit PPDU that carries the MU-RTS frame. An EHT station reads bandwidth information from an EHT UL BW field, and a legacy station reads bandwidth information from a UL BW field. This ensures that all stations can learn bandwidth information, and improves system compatibility.

In another possible design of the first aspect or the second aspect, the bandwidth information is carried by the reserved field of the common information field, for example, an uplink high efficiency signal A2 field. A reserved field of the existing MU-RTS frame structure is reused, so that no additional bit needs to be added. This reduces signaling overheads.

In another possible design of the first aspect or the second aspect, the common information field further includes an uplink bandwidth UL BW field and additional bandwidth information. The UL BW field and the additional bandwidth information indicate a bandwidth of a PPDU that carries the MU-RTS frame. Therefore, an EHT station reads bandwidth information from the UL BW field and the additional bandwidth information, and a legacy station reads bandwidth information from the UL BW field. This feature ensures that all stations can learn the bandwidth information, and improves system compatibility.

In another possible design of the first aspect or the second aspect, the common information field further includes indication information. The indication information indicates whether the additional bandwidth information exists. The indication information indicates whether the legacy station or the EHT station needs to read the additional bandwidth information. This ensures that the legacy station may read the frame structure, and improves system compatibility.

In another possible design of the first aspect or the second aspect, the indication information is carried by the reserved field of the common information field, for example, a Doppler field. A reserved field of an existing frame structure is reused, so that no additional bit needs to be added. This reduces signaling overheads.

In another possible design of the first aspect or the second aspect, the bandwidth includes: 40 MHz, 80 MHz, 160 MHz, 80 MHz+80 MHz, 240 MHz, 160 MHz+80 MHz, 320 MHz, or 160 MHz+160 MHz.

In another possible design of the first aspect or the second aspect, a new trigger frame structure, for example, EHT MU-RTS, is defined. An EHT MU-RTS type is added to a trigger type field in the common information field of the trigger frame, to indicate that the trigger frame is a trigger frame of the EHT MU-RTS type. The trigger type field is a reserved value. The reserved value is any value from 8 to 15. The common information field of the newly defined EHT MU-RTS frame indicates the channel puncture information, so that all the stations can learn channel occupancy from the common information field, and a fragmented discontinuous channel can be protected. This can maximize channel resource usage and improve spectrum efficiency.

According to a third aspect, an embodiment of this application provides a channel puncture mode indication method. The method includes: An access point generates an MU-RTS frame, where the MU-RTS frame includes a user information field, and the user information field includes channel puncture information; and then the access point sends the MU-RTS frame to a station, where the channel puncture information indicates whether at least one 20 MHz channel is occupied. The user information field of the MU-RTS frame is reused to indicate the channel puncture information, so that different stations can learn the channel puncture information, and no additional bit needs to be added. This reduces signaling overheads. In addition, the channel puncture information indicates channel occupancy in a preamble puncture mode, so that a secondary channel in an idle state can be effectively used. This improves channel protection flexibility, channel usage, and spectrum efficiency.

According to a fourth aspect, an embodiment of this application provides a channel puncture mode indication method. The method includes: A station receives an MU-RTS frame sent by an access point, where the MU-RTS frame includes a user information field, the user information field includes channel puncture information, and the channel puncture information indicates whether at least one 20 MHz channel is occupied; and the station sends a CTS frame to the access point based on the channel puncture information. The user information field of the MU-RTS frame indicates the channel puncture information, so that different stations can learn the channel puncture information, and no additional bit needs to be added. This reduces signaling overheads. The channel puncture information indicates channel occupancy in a preamble puncture mode, so that a secondary channel in an idle state can be effectively used. This improves channel protection flexibility, channel usage, and spectrum efficiency.

According to a fifth aspect, an embodiment of this application provides a channel puncture mode indication method. The method includes: An access point generates a physical layer protocol data unit PPDU, where optionally, the PPDU carries an RTS frame or an MU-RTS frame, the PPDU includes a bandwidth field, and the bandwidth field includes channel puncture information; and then the access point sends the PPDU to a station, where the channel puncture information indicates a puncture status of a channel whose bandwidth is greater than 160 MHz. The bandwidth field of the PPDU indicates the channel puncture information, and a structure of the RTS frame or the MU-RTS frame carried by the PPDU does not need to be modified. This implements high backward compatibility. In addition, the channel puncture information indicates channel occupancy in a preamble puncture mode, so that a secondary channel in an idle state can be effectively used. This improves channel protection flexibility and channel resource usage.

According to a sixth aspect, an embodiment of this application provides a channel puncture mode indication method. The method includes: A station receives a physical layer protocol data unit PPDU sent by an access point, where the PPDU includes a bandwidth field, the bandwidth field includes channel puncture information, and the channel puncture information indicates a puncture status of a channel whose bandwidth is greater than 160 MHz; and then the station sends a CTS frame to the access point based on the channel puncture information. The bandwidth field of the PPDU indicates the channel puncture information, and a structure of an RTS frame or an MU-RTS frame carried by the PPDU does not need to be modified. This implements high backward compatibility. In addition, the channel puncture information indicates channel occupancy in a preamble puncture mode, so that a secondary channel in an idle state can be effectively used. This improves channel protection flexibility and channel resource usage.

According to a seventh aspect, an embodiment of this application provides a communication apparatus. The communication apparatus is configured to implement the methods and the functions that are performed by the access point in the first aspect, the third aspect, and the fifth aspect. The communication apparatus is implemented by using hardware/software. The hardware/software of the communication apparatus includes modules corresponding to the foregoing functions.

According to an eighth aspect, an embodiment of this application provides a communication apparatus. The communication apparatus is configured to implement the methods and the functions that are performed by the station in the second aspect, the fourth aspect, and the sixth aspect. The communication apparatus is implemented by using hardware/software. The hardware/software of the communication apparatus includes modules corresponding to the foregoing functions.

According to a ninth aspect, an embodiment of this application provides a communication apparatus. The communication apparatus is applied to an access point. The communication apparatus may be an access point or a chip in an access point. The communication apparatus includes a processor, a memory, and a communication bus. The communication bus is configured to implement connection and communication between the processor and the memory. The processor executes a program stored in the memory to implement the steps in the first aspect, the third aspect, and the fifth aspect.

According to a tenth aspect, an embodiment of this application provides a communication apparatus. The communication apparatus is applied to a station. The communication apparatus may be a station or a chip in a station. The communication apparatus includes a processor, a memory, and a communication bus. The communication bus is configured to implement connection and communication between the processor and the memory. The processor executes a program stored in the memory to implement the steps provided in the second aspect, the fourth aspect, and the sixth aspect.

According to an eleventh aspect, this application provides a computer-readable storage medium. The computer-readable storage medium stores instructions. When the instructions are run on a computer, the computer is enabled to perform the method in the foregoing aspects.

According to a twelfth aspect, this application provides a computer program product including instructions. When the instructions are run on a computer, the computer is enabled to perform the method in the foregoing aspects.

According to a thirteenth aspect, a chip is provided. The chip includes a processor and is configured to invoke instructions from a memory and run the instructions stored in the memory, so that a communication device in which the chip is installed performs the method in any one of the foregoing aspects.

According to a fourteenth aspect, an embodiment of this application further provides another chip. The chip may be a chip in an access point or a station. The chip includes an input interface, an output interface, and a processing circuit. The input interface, the output interface, and the circuit are connected to each other through an internal connection path. The processing circuit is configured to perform the method in any one of the foregoing aspects.

According to a fifteenth aspect, another chip is provided. The chip includes an input interface, an output interface, and a processor. Optionally, the chip further includes a memory. The input interface, the output interface, the processor, and the memory are connected to each other through an internal connection path. The processor is configured to execute code in the memory. When the code is executed, the processor is configured to perform the method in any one of the foregoing aspects.

According to a sixteenth aspect, an apparatus is provided. The apparatus is configured to implement the method according to any one of the foregoing aspects.

BRIEF DESCRIPTION OF THE DRAWINGS

To describe the technical solutions in embodiments of this application or in the background more clearly, the following briefly describes the accompanying drawings for describing embodiments of this application or the background.

FIG. 3 is a schematic diagram of a channel resource according to an embodiment of this application;

FIG. 4 is a schematic diagram of a preamble puncture mode in which a bandwidth field is set to 4 according to an embodiment of this application;

FIG. 5 is a schematic diagram of a preamble puncture mode in which a bandwidth field is set to 5 according to an embodiment of this application;

FIG. 10 is a schematic diagram of a structure of a common information field of an MU-RTS frame according to an embodiment of this application;

FIG. 11(A) is a schematic diagram of a common information field according to an embodiment of this application;

FIG. 11(B) is a schematic diagram of another common information field according to an embodiment of this application;

FIG. 12(A) is a schematic diagram of a common information field according to an embodiment of this application;

FIG. 12(B) is a schematic diagram of another common information field according to an embodiment of this application;

FIG. 13(A) is a schematic diagram of an EHT bandwidth information indication according to an embodiment of this application;

FIG. 13(B) is a schematic diagram of another EHT bandwidth information indication according to an embodiment of this application;

FIG. 14 is a schematic diagram of another EHT bandwidth information indication according to an embodiment of this application;

DETAILED DESCRIPTION OF ILLUSTRATIVE EMBODIMENTS

The following describes embodiments of this application with reference to the accompanying drawings in embodiments of this application.

An embodiment of this application proposes a channel puncture mode indication method. The method may be applied to a wireless communication system, for example, a cellular network or wireless local area network (WLAN) system, especially a WLAN system supporting 802.11be, EHT, or Wi-Fi 7. The method may be implemented by a communication device in the wireless communication system or a chip or a processor in a communication device. The following uses a WLAN as an example for description.

Figure 1:
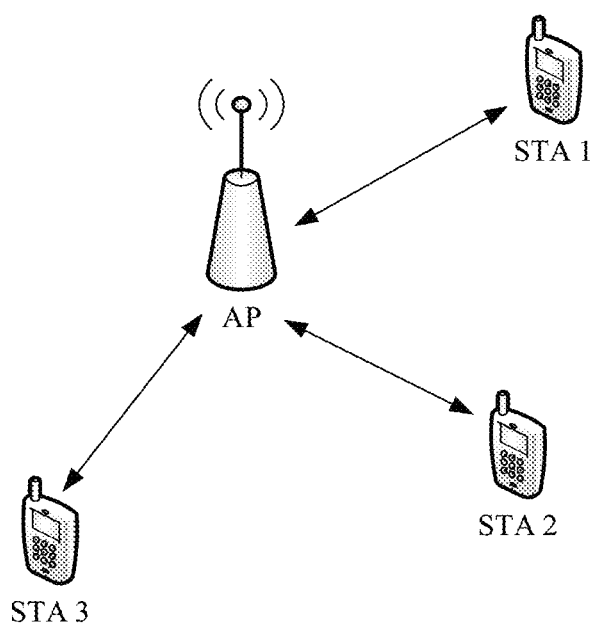
FIG. 1 is a schematic diagram of an architecture of a communication system according to an embodiment of this application.

FIG. 1 is a schematic diagram of an architecture of a communication system according to an embodiment of this application. The communication system includes at least one access point (AP) and at least one station (STA). The AP may be an access point used for a mobile user to access a wired network. The AP is mainly deployed inside a house, a building, and a campus, with a typical coverage radius of tens of meters to hundreds of meters. Certainly, the AP may alternatively be deployed outdoors. The AP is equivalent to a bridge that connects the wired network and a wireless network. The AP is mainly used to connect wireless network clients to each other, and then connect the wireless network to the Ethernet. Specifically, the AP may be a terminal device or a network device with a wireless fidelity (Wi-Fi) chip. The AP may be a device that supports 802.11a, 802.11g, and 802.11n standards, or may be a device that supports a plurality of WLAN standards such as 802.11ac, 802.11ax, and 802.11be. The STA may be a wireless communication chip, a wireless sensor, or a wireless communication terminal, for example, a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. The STA may support 802.11a, 802.11g, and 802.11n standards. The STA may alternatively support a plurality of WLAN standards such as 802.11ac, 802.11ax, and 802.11be. The STA may be an extremely high throughput (EHT) station, a legacy station (legacy STA), or the like. For a current 802.11be standard protocol, an existing station in a previous-generation standard protocol such as 802.11ac/ax is referred to as a legacy station.

The WLAN system can provide high-speed and low-latency transmission. With continuous evolution of WLAN application scenarios, the WLAN system is applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops, and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicles device in the internet of vehicles, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not specifically limited in embodiments of this application, and are merely examples for description herein.

In this embodiment of this application, the AP may send a multi-user request to send frame (MU-RTS) frame to the STA, and the STA returns a clear to send frame to the AP after receiving the MU-RTS frame. Alternatively, the STA may send an MU-RTS frame to the AP, and the AP returns a CTS frame to the STA after receiving the MU-RTS frame.

Figure 2:
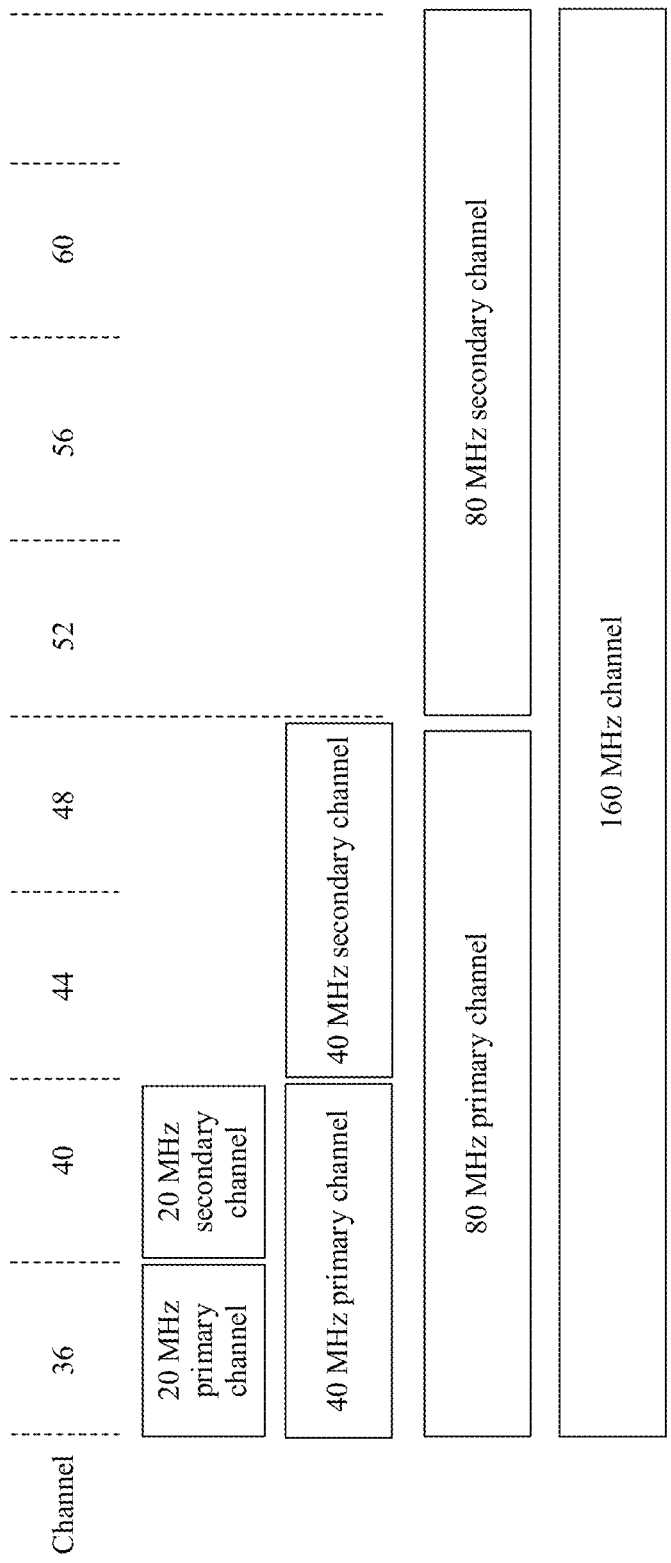
FIG. 2 is a schematic diagram of a 160 MHz primary and secondary channel according to an embodiment of this application.

The 802.11a and 802.11g standards use a channel bandwidth of 20 MHz, and 802.11n supports bonding of two adjacent 20 MHz channels as a 40 MHz channel. This increases a channel transmission rate. The 802.11ac standard further uses 80 MHz, (80+80) MHz (discontinuous and non-overlapping), and 160 MHz channels. 802.11ax inherits the bandwidth standard of 802.11ac. For the 802.11be standard, it is currently considered that a bandwidth is increased to be greater than 160 MHz, for example, 240 MHz or 320 MHz. FIG. 2 is a schematic diagram of a 160 MHz primary and secondary channel according to an embodiment of this application. The 160 MHz channel is divided into an 80 MHz primary channel and an 80 MHz secondary channel. The 80 MHz primary channel is further divided into a 40 MHz primary channel and a 40 MHz secondary channel. The 40 MHz primary channel is further divided into a 20 MHz primary channel and a 20 MHz secondary channel.

Because the 802.11ac standard starts to support a channel bonding mechanism, the channel bonding mechanism brings some disadvantages. In the 802.11ac standard, when a narrowband secondary channel of bonded channels is busy, a transmit end cannot use a larger secondary channel. FIG.

3 is a schematic diagram of a channel resource according to an embodiment of this application. An 80 MHz channel is used as an example. When a 20 MHz secondary channel is busy, even if a 40 MHz secondary channel is idle, a transmit end can use only a bandwidth of a 20 MHz primary channel, but cannot use an air interface resource of the 40 MHz secondary channel. Consequently, the air interface resource of the 40 MHz secondary channel is wasted. In high-density scenarios, more busy channels are caused, and channel fragmentation is more likely to occur.

To resolve the foregoing problems, the 802.11ax standard supports continuous channel bonding, and introduces a preamble puncture mode for discontinuous channel bonding. In the 802.11ax standard, for a high efficiency (HE) multi-user physical layer protocol data unit (PPDU), a high efficiency signal field A (HE-SIG-A) in a preamble includes a 3-bit bandwidth field that has eight different values (separately corresponding to 0 to 7) in total to separately indicate four non-preamble puncture modes and four preamble puncture modes.

The four non-preamble puncture modes include: The bandwidth field being set to 0 indicates a 20 MHz bandwidth; the bandwidth field being set to 1 indicates a 40 MHz bandwidth; the bandwidth field being set to 2 indicates an 80 MHz bandwidth in a non-preamble puncture mode; and the bandwidth field being set to 3 indicates a 160 MHz bandwidth and an 80 MHz+80 MHz bandwidth in a non-preamble puncture mode. The four non-preamble puncture modes are the same as data packet bandwidth modes supported by an HE SU PPDU and an HE TB PPDU in the 802.11ac standard and the 802.11ax standard.

Figure 6:
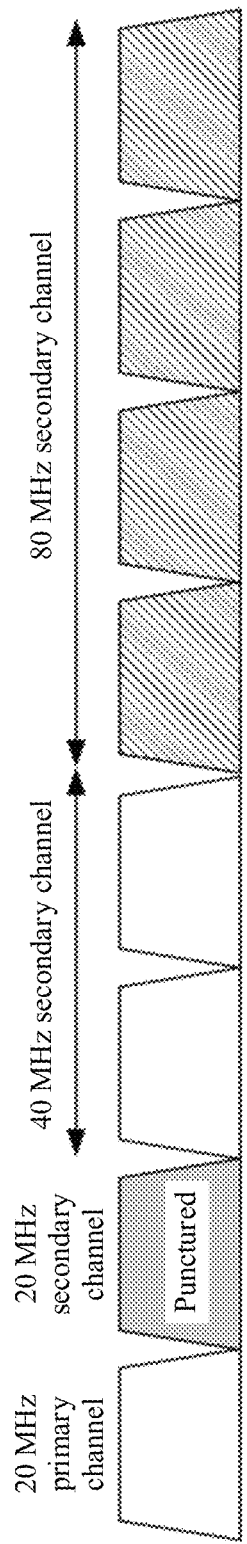
FIG. 6 is a schematic diagram of a preamble puncture mode in which a bandwidth field is set to 6 according to an embodiment of this application.
Figure 7:
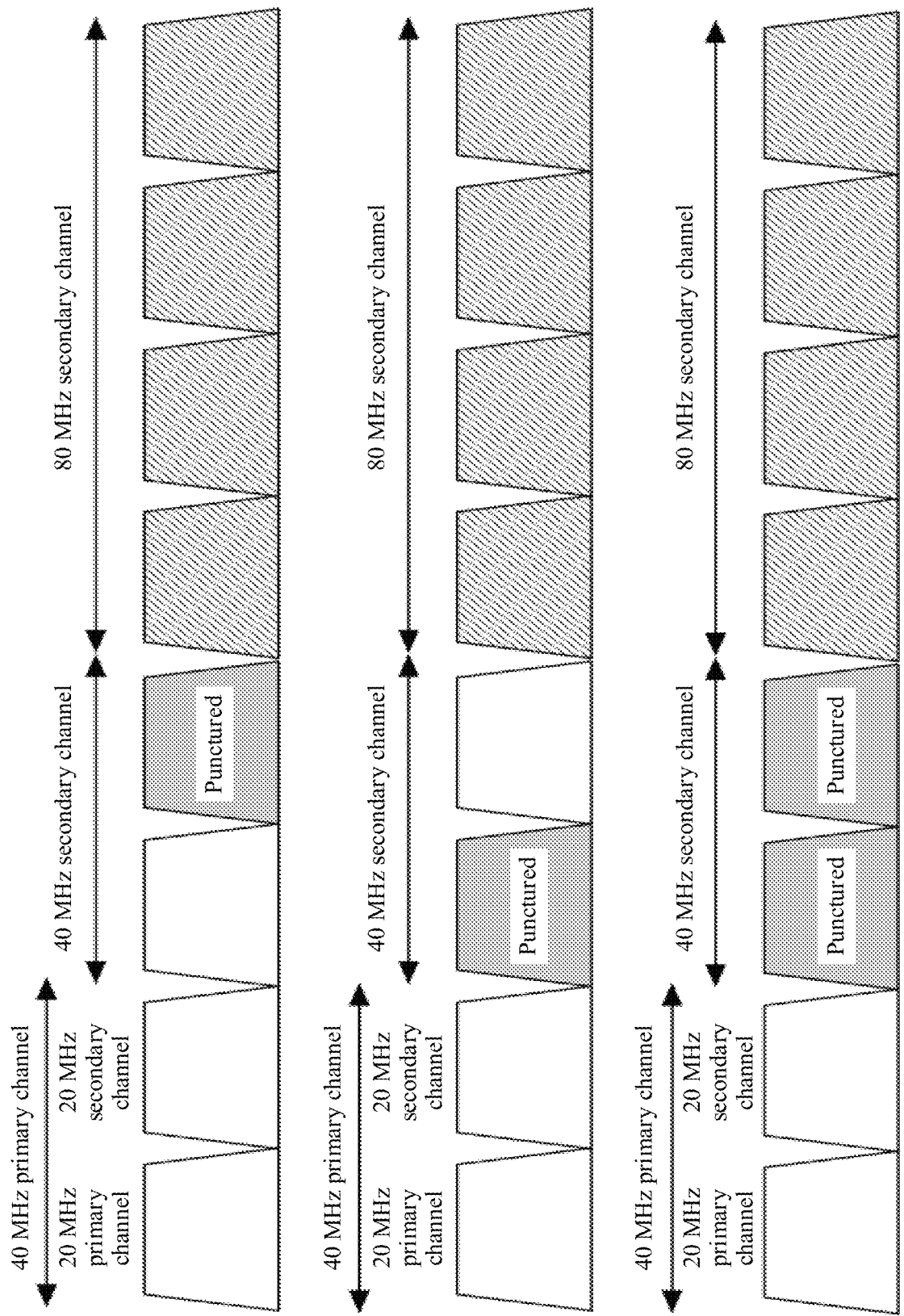
FIG. 7 is a schematic diagram of a preamble puncture mode in which a bandwidth field is set to 7 according to an embodiment of this application.

The four preamble puncture modes include: FIG. 4 is a schematic diagram of a preamble puncture mode in which a bandwidth field is set to 4 according to an embodiment of this application. The bandwidth field being set to 4 indicates an 80 MHz bandwidth in a puncture mode. Only a preamble of a 20 MHz secondary channel is punctured. Even if the 20 MHz secondary channel is busy, the AP may still send data by using spectrum resources of the 20 MHz primary channel and the 40 MHz secondary channel. FIG. 5 is a schematic diagram of a preamble puncture mode in which a bandwidth field is set to 5 according to an embodiment of this application. The bandwidth field being set to 5 indicates an 80 MHz bandwidth in a puncture mode. A preamble of only one of two 20 MHz channels in a 40 MHz secondary channel is punctured. Even if a preamble of a first 20 MHz channel in the 40 MHz secondary channel is punctured, the AP may still send data by using spectrum resources of a 20 MHz primary channel, a 20 MHz secondary channel, and a second 20 MHz channel in the 40 MHz secondary channel. FIG. 6 is a schematic diagram of a preamble puncture mode in which a bandwidth field is set to 6 according to an embodiment of this application. The bandwidth field being set to 6 indicates a 160 MHz bandwidth or an 80 MHz+80 MHz bandwidth in a puncture mode. Only a 20 MHz secondary channel in an 80 MHz primary channel is punctured. When the bandwidth field is set to 6, only a puncture status of the 80 MHz primary channel is determined. Any combination may be implemented for an 80 MHz secondary channel. Usage of the channels is similar to that in the preamble puncture mode in which the bandwidth field is set to 4 or 5. Details are not described herein again. FIG. 7 is a schematic diagram of a preamble puncture mode in which a bandwidth field is set to 7 according to an embodiment of this application. The bandwidth field being set to 7 indicates a 160 MHz bandwidth or an 80 MHz+80 MHz bandwidth in a puncture mode. A 40 MHz primary channel in an 80 MHz primary channel is not punctured. There are three cases in total for a 40 MHz secondary channel in the 80 MHz primary channel. Any combination may be implemented for an 80 MHz secondary channel. Usage of the channels is similar to that in the preamble puncture mode in which the bandwidth field is set to 4 or 5. Details are not described herein again.

In a WLAN environment, to avoid a collision in signal transmission, a clear channel assessment (CCA) mechanism needs to be used to perform physical carrier sense in a channel contention process, to prevent transmission initiated by a station from interfering with another station that is sending data. However, due to existence of a hidden station, physical carrier sense cannot ensure that transmission initiated by the station does not affect a station that is in a receiving state. Therefore, the early 802.11 standard introduces a virtual carrier sense mechanism. A network allocation vector (NAV) is set to ensure that a transmit end and a receive end are not interfered with by another station. Before transmission starts, a transmit station and a receive station may protect a period of time through frame interaction of a request to send (RTS) frame and a clear to send (CTS) frame, so that interference from another station is avoided during the period of time.

In the 802.11ax standard, multi-user transmission is widely applied. Each time before multi-user transmission is performed, the AP needs to interact with each station through an RTS/CTS frame to perform channel protection. This results in high signaling overheads. The 802.11ax standard proposes an MU-RTS mechanism. The AP may simultaneously interact with a plurality of stations through an MU-RTS/CTS frame to complete channel protection. This greatly improves system efficiency. However, because the bandwidth is expanded from 160 MHz to 320 MHz, as denser users access channels, more busy channels are caused, and channel fragmentation is more likely to occur. Because an MU-RTS frame in 802.11ax cannot protect discontinuous secondary channels during channel protection, an idle secondary channel cannot be effectively used. This results in low channel resource usage. To resolve the foregoing technical problems, embodiments of this application provide the following solutions.

It should be noted that the method in embodiments of this application may be applied to communication between an access point and an access point, or may be applied to communication between an access point and a station, and communication between stations. Optionally, communication between access points may be coordinated transmission. Optionally, communication between stations may be device-to-device (D2D) transmission. For ease of description, communication between an access point and a station is used as an example for description in embodiments of this application.

Figure 8:
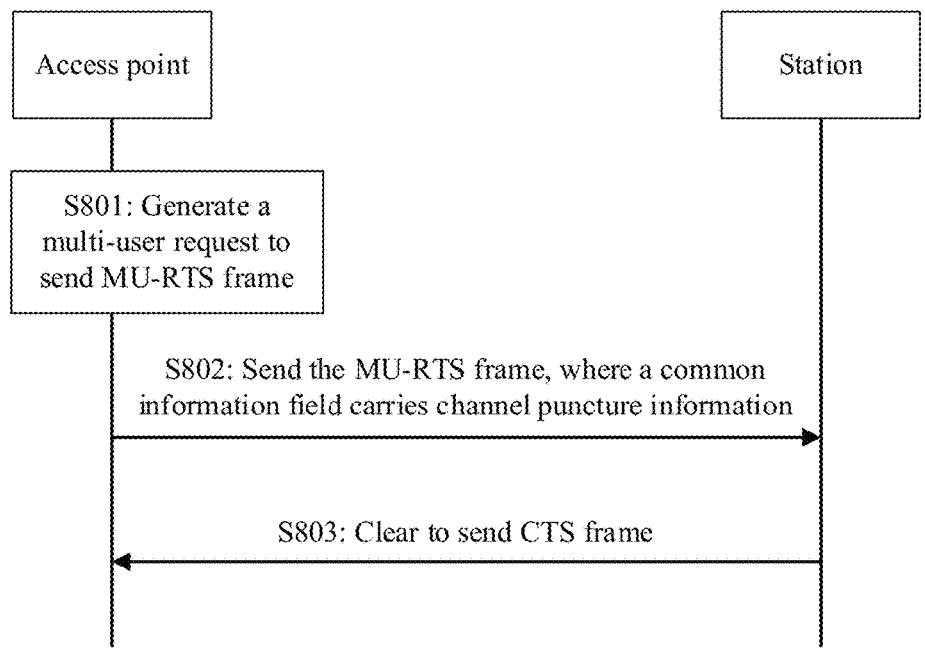
FIG. 8 is a schematic flowchart of a channel puncture mode indication method according to an embodiment of this application.

FIG. 8 is a schematic flowchart of a channel puncture mode indication method according to an embodiment of this application. This embodiment of this application may be applied to a wireless local area network WLAN system, for example, a WLAN system supporting 802.11be, or may be applied to a cellular network. The method may be implemented by an access point or a chip in an access point. This embodiment of this application includes the following steps.

S801: An access point generates a multi-user request to send (MU-RTS) frame, where the MU-RTS frame includes a common information field, and the common information field includes channel puncture information.

The channel puncture information may indicate whether at least one 20 MHz channel is occupied. Further, the channel puncture information indicates occupancy of the at least one 20 MHz channel in the preamble puncture mode, and may, for example, indicate a channel puncture status of a channel whose bandwidth is greater than 160 MHz, for example, whether at least nine 20 MHz channels are occupied, or whether twelve 20 MHz channels are occupied, or whether sixteen 20 MHz channels are occupied. Certainly, the channel puncture information may alternatively indicate a puncture status of four 20 MHz channels or eight 20 MHz channels. The channel puncture information may alternatively have another name, for example, channel information or channel occupancy information. Whether a channel is occupied may alternatively be referred to as whether a channel is punctured or whether a channel is available.

Figure 9:
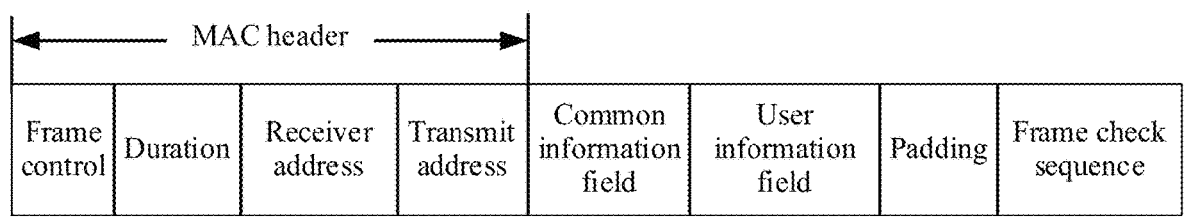
FIG. 9 is a schematic diagram of a structure of a trigger frame according to an embodiment of this application.

The channel puncture information may be carried by the common information field of the MU-RTS frame. For example, FIG. 9 is a schematic diagram of a structure of a trigger frame according to an embodiment of this application. The trigger frame may be an MU-RTS frame. The MU-RTS frame may include a media access control (MAC) header, a common information field, a user information field, a padding field, and a frame check sequence (FCS) field. The MAC header includes a frame control field, a duration field, a receiver address (RA) field, and a transmit address (TA) field. The common information field of the MU-RTS frame may carry the channel puncture information.

Further, the channel puncture information may be carried by a reserved field of the common information field. For example, FIG. 10 is a schematic diagram of a structure of a common information field of an MU-RTS frame according to an embodiment of this application. The common information field includes a trigger type field, an uplink length (UL length) field, a more trigger frame (more TF) field, a channel status required (CS required) field, an uplink bandwidth (UL BW) field, a GI and high efficiency short training field (HE-STF) type (GI and HE-STF type) field, a multi-user multiple-input multiple-output (MU-MIMO) HE-LTF type field, a number of HE-LTF symbols and midamble periodicity field, an uplink space-time block coding (STBC) field, a low-density parity-check code (LDPC) extra symbol segment field, an AP transmit power (AP TX power) field, a pre-FEC padding factor field, a PE disambiguity field, an uplink spatial reuse (UL spatial reuse) field, a Doppler field, an uplink high efficiency signal field A2 (HE-SIG-A2) reserved (UL HE-SIG-A2 reserved) field, and a reserved field. In the MU-RTS frame, the uplink length field, the GI and HE-LTF type field, the MU-MIMO HE-LTF type field, the number of HE-LTF symbols and midamble periodicity field, the uplink space-time block coding field, the LDPC extra symbol segment field, the pre-FEC padding factor field, the PE disambiguity field, the Doppler field, the uplink HE-SIG-A2 reserved field, the AP transmit power field, and the uplink spatial reuse field are all reserved fields. The channel puncture information may be carried by the foregoing reserved fields, to implement channel protection.

Optionally, the channel puncture information is a bitmap. The bitmap includes at least one bit. One bit corresponds to one 20 MHz channel. The bit indicates whether the 20 MHz channel is occupied. The bitmap may include 16 bits. One bit corresponds to one 20 MHz channel. In this case, the channel puncture information may indicate a puncture status of a 320 MHz channel. The bitmap may alternatively include 8 bits. Each bit corresponds to one 40 MHz channel. For example, the 8-bit bitmap indicates the channel puncture information. If the bitmap is 00000000, it indicates that none of channels is punctured. If the bitmap is 01000000, it indicates that only a second 40 MHz secondary channel is punctured, and other channels are not punctured. Other bitmaps are similar, and details are not described herein again.

Optionally, the channel puncture information includes a plurality of bits. One value of the plurality of bits indicates at least one type of occupancy of the at least one 20 MHz channel. The plurality of bits may be 6 bits, 8 bits, 9 bits, or the like. For example, if the 6 bits indicate the channel puncture information, 64 different puncture types may be indicated. When values of the 6 bits are all 0, it indicates a puncture type in which none of channels is punctured. When values of the 6 bits are 010000, it may indicate a puncture type in which a 20 MHz secondary channel is punctured, and whether another secondary channel is punctured is not limited.

Further optionally, if one field of the common information field cannot indicate all puncture types, a plurality of fields may be jointly used to indicate all the puncture types. For example, the UL length field (B4-B15) and the AP transmit power field (B28-B33) may be jointly used to indicate all the puncture types. Alternatively, the AP transmit power field (B28-B33) and the uplink spatial reuse field (B37-B52) are jointly used to indicate all the puncture types.

Optionally, the reserved field of the common information field in the MU-RTS frame may be reused to carry the channel puncture information. For example, FIG. 11(A) is a schematic diagram of a common information field according to an embodiment of this application. In the MU-RTS frame, an uplink spatial reuse field is a reserved field. The uplink spatial reuse field may be reused to indicate the channel puncture information. The channel puncture information may be a bitmap. If a value of a bit in the bitmap is 1, it indicates that a channel corresponding to the bit is occupied or punctured. If a value of a bit in the bitmap is 0, it indicates that a channel corresponding to the bit is available or not punctured. 0 or 1 may alternatively indicate opposite cases. Another field of the MU-RTS frame and another field of the common information field in FIG. 10 include the same information. Details are not described herein again. For another example, FIG. 11(B) is a schematic diagram of another common information field according to an embodiment of this application. In the MU-RTS frame, an AP transmit power field (B28 to B33) of the common information field is a reserved field. One or more bits in the AP transmit power field may be reused to indicate one value. One value corresponds to one puncture type. For example, if values of 8 bits are 0, it indicates that none of channels is punctured. Another field of the MU-RTS frame and another field of the common information field in FIG. 10 include the same information. Details are not described herein again.

Optionally, the MU-RTS frame may be a trigger frame defined in an existing protocol (for example, 802.11ax). For a frame structure of the MU-RTS frame, refer to a definition in 802.11ax. For example, if a value of a trigger type field of the MU-RTS frame is 3, it indicates that the frame is a trigger frame of an MU-RTS type. A reserved field of an existing MU-RTS frame is reused to carry the channel puncture information, so that compatibility is good and implementation is simple. In addition, the reserved field carries the channel puncture information, so that no additional bit needs to be added. This reduces signaling overheads.

Optionally, the MU-RTS frame may alternatively be a newly defined trigger frame. In other words, a new trigger frame structure is defined. The MU-RTS frame is, for example, referred to as an extremely high throughput multi-user request to send (EHT MU-RTS) frame. In this case, an EHT MU-RTS type needs to be added to the trigger type field of the common information field. Then, the channel puncture information is carried by a common information field of a newly defined EHT MU-RTS frame. The trigger type field of the EHT MU-RTS frame may be any value from 8 to 15, indicating that the frame is a trigger frame of an EHT MU-RTS type. For example, a value of the trigger type field of the EHT MU-RTS frame is 8.

For example, FIG. 12(A) is a schematic diagram of a common information field according to an embodiment of this application. In the EHT MU-RTS frame, a new field, for example, an EHT channel indication field, is defined in the common information field. The channel indication field carries the channel puncture information. The channel puncture information may be a bitmap. If a value of a bit in the bitmap is 1, it indicates that a channel corresponding to the bit is occupied or punctured. If a value of a bit in the bitmap is 0, it indicates that a channel corresponding to the bit is available or not punctured. 0 or 1 may alternatively indicate opposite cases. A location and a bit quantity that are indicated by the channel are not fixed, and the bit quantity may be 8, or may be another integer. Optionally, another field of the EHT MU-RTS frame and another field of the common information field in FIG. 10 include similar information. Details are not described herein again.

For another example, FIG. 12(B) is a schematic diagram of another common information field according to an embodiment of this application. In the EHT MU-RTS frame, a new field, for example, an EHT puncture type field, is defined in the common information field. The EHT puncture type field carries the channel puncture information. The channel puncture information may be a value. One value corresponds to one puncture type. If the value is 0, it indicates that none of channels is punctured. A location and a bit quantity of the EHT puncture type field are not fixed. The bit quantity may be 2, 3, 7, or 8, or may be another integer. Another field of the EHT MU-RTS frame and another field of the common information field in FIG. 10 include similar information. Details are not described herein again.

Optionally, the common information field further includes bandwidth information. The bandwidth information indicates a bandwidth of a physical layer protocol data unit (PPDU) that carries the MU-RTS frame. A UL BW field of the existing MU-RTS frame includes 2 bits, and indicates a maximum bandwidth of 160 MHz or (80+80) MHz. However, 802.11be needs to expand a bandwidth to be greater than 160 MHz, for example, 240 MHz and 320 MHz. Therefore, a reserved bit in the common information field of the MU-RTS frame may be reused to indicate the bandwidth information. For example, the uplink high efficiency signal A2 field of the common information field carries the bandwidth information. Alternatively, a new field, for example, an EHT uplink bandwidth (EHT UL BW) field, may be defined in the common information field of the EHT MU-RTS frame. The EHT uplink bandwidth field carries the bandwidth information. The bandwidth indicated by the bandwidth information may be specifically CBW40, CBW80, CBW160, CBW80+80, CBW240, CBW160+80, CBW320, or CBW160+160. CBW40 indicates that the bandwidth is 40 MHz, CBW80+80 indicates that the bandwidth is double 80 MHz, and others are similar.

For example, FIG. 13(A) is a schematic diagram of an EHT bandwidth information indication according to an embodiment of this application. In the MU-RTS frame, one or more bits in the uplink high efficiency signal A2 reserved field of the common information field are reused to indicate full EHT bandwidth information. An EHT station reads the bandwidth information from the EHT UL BW field. A legacy station still reads the bandwidth information from the UL BW field. The EHT UL BW field may include 4 bits, but is not limited. Another field of the MU-RTS frame and another field of the common information field in FIG. 10 include the same information. Details are not described herein again. For another example, FIG. 13(B) is a schematic diagram of another EHT bandwidth information indication according to an embodiment of this application. In the newly defined MU-RTS frame, a new field (for example, EHT UL BW) is defined in the common information field to indicate the bandwidth information. An EHT station reads the bandwidth information from the EHT UL BW field. A legacy station still reads the bandwidth information from the UL BW field. A location and a bit quantity of the new field are not fixed. The bit quantity may be 2, 3, or 4, or may be another integer. Another field of the EHT MU-RTS frame and another field of the common information field in FIG. 10 include similar information. Details are not described herein again.

Optionally, the common information field further includes an uplink bandwidth UL BW field and additional bandwidth information. The UL BW field and the additional bandwidth information indicate a bandwidth of a PPDU that carries the MU-RTS frame. In other words, for the EHT station, the UL BW field and the additional bandwidth field jointly indicate the bandwidth of the PPDU that carries the MU-RTS frame. The EHT station may read the UL BW field and the additional bandwidth information, for example, an additional bandwidth for EHT (additional BW for EHT) field, to determine the bandwidth of the PPDU that carries the MU-RTS frame. The legacy station still reads the bandwidth information from the UL BW field. The bandwidth of the PPDU is a sum of a bandwidth value indicated by the UL BW field and a bandwidth value indicated by the additional bandwidth for EHT field.

Specifically, the EHT station may determine the bandwidth of the PPDU by using the following two methods.

In a first method, a value of the UL BW field and a value of the additional BW for EHT field are separately read, and a bandwidth indicated by the UL BW field and a bandwidth indicated by the additional BW for EHT field are determined and added to obtain the bandwidth of the PPDU. If the bandwidth read from the UL BW field is 160 MHz and the bandwidth read from the additional BW for EHT field is 80 MHz, a value of the EHT UL BW field is 240 MHz.

In a second method, a binary value of the UL BW field and a binary value of the additional BW for EHT field are combined and converted into a decimal value, and a bandwidth corresponding to the decimal value is used as the bandwidth of the PPDU. For example, if the binary value of the UL BW field is 11 and the binary value of the additional BW for EHT field is 10, a combined value is ion and converted into the decimal value of ii. If the bandwidth corresponding to 11 is 240 MHz or (80 MHz+160 MHz), the bandwidth of the PPDU is 240 MHz or (80 MHz+160 MHz).

It should be noted that the reserved bit in the common information field of the MU-RTS frame may be reused to indicate the uplink bandwidth UL BW field and the additional BW for EHT field. Alternatively, a new field, for example, the UL BW field and the additional BW for EHT field, may be defined in the common information field of the EHT MU-RTS frame. The UL BW field and the additional BW for EHT field jointly indicate the bandwidth information. For another example, the new field is a bandwidth field and indicates a bandwidth of a PPDU that carries the EHT MU-RTS frame.

Optionally, the common information field further includes indication information. The indication information indicates whether the additional bandwidth information exists. In the MU-RTS frame, the reserved bit in the common information field may be reused to indicate the indication information. For example, an EHT uplink bandwidth indication (EHT UL BW indication) is reused to indicate whether the additional bandwidth information exists. If the EHT UL BW indication is 1, it indicates that the additional bandwidth information field exists, and the station needs to read the additional BW for EHT field. If the indication information is 0, it indicates that no additional bandwidth information field exists, and the station does not need to read the additional BW for EHT field. 0 or 1 may alternatively indicate opposite cases. If the indication information value is 0, the EHT station or the legacy station only needs to read the bandwidth information from the UL BW field. If the indication information is 1, the legacy station only needs to read the bandwidth information from the UL BW field, and the EHT station needs to read the bandwidth information from the UL BW field and the additional BW for EHT field. Therefore, capability of the legacy station is ensured.

For example, FIG. 14 is a schematic diagram of another EHT bandwidth information indication according to an embodiment of this application. In the MU-RTS frame, the Doppler field of the common information field is reused to indicate the EHT UL BW indication, and the uplink high efficiency signal A2 reserved field is reused to indicate the additional bandwidth information. Another field of the MU-RTS frame and another field of the common information field in FIG. 10 include similar information. Details are not described herein again.

S802: The access point sends the MU-RTS frame to the station.

S803: The STA sends a CTS frame to the access point based on the channel puncture information.

Specifically, after obtaining primary channel access permission supported by a current device, the access point uses a point coordination function interframe space (PIFS) and energy detection (ED) channel access manner in the bandwidth supported by the device, namely, waits for PIFS time and performs energy detection, to determine an accessible secondary channel from all secondary channels. The access point sends the MU-RTS frame or the newly defined EHT MU-RTS frame on the primary channel and the accessible secondary channel. The MU-RTS frame or the EHT MU-RTS frame carries the channel puncture information. The channel puncture information indicates channel occupancy of a receive end in a preamble puncture mode, namely, which channels are available and which channels are unavailable. The access point sets a NAV on these available channels from a perspective of a transmit end. After receiving the MU-RTS frame or the EHT MU-RTS frame, the receive end replies with the CTS frame on the available channels, and sets an NAV for these available channels from a perspective of the receive end, to implement channel protection.

As described above, the channel puncture information is carried by the common information field of the MU-RTS frame. Optionally, the channel puncture information may be carried by the user information field of the trigger frame. The channel puncture information indicates channel occupancy.

In an example, a user information field corresponding to a special AID may be added to the user information field. The user information field carries the channel puncture information. A plurality of stations learn the channel puncture information from the user information field corresponding to the special AID. However, because the user information field corresponding to the special AID is added to the user information field, signaling overheads are increased.

In another example, the user information field of the trigger frame includes user information fields corresponding to a plurality of users. The channel puncture information may be carried by a user information field corresponding to each user. The plurality of stations may learn the channel puncture information from the user information field corresponding to each user. However, because each user corresponds to one user information field, the plurality of user information fields of the trigger frame carry same type of information. This results in high signaling overheads.

Compared with the foregoing manner in which the channel puncture information is carried by the user information field, the channel puncture information is carried by the common information field of the trigger frame, so that different stations can learn channel occupancy from the common information field. This can reduce signaling overheads.

In this embodiment of this application, the channel puncture information carried by the common information field indicates channel occupancy in the preamble puncture mode, so that a secondary channel in an idle state can be effectively used. This improves channel protection flexibility and channel resource usage. In addition, one or more reserved fields of the user information field are reused, so that compatibility is good and implementation is simple. In addition, the reserved field is used, so that no additional bit needs to be added. This reduces signaling overheads.

TABLE 1

| Trigger type field value | Trigger frame variant |
|---|---|
| 0 | Basic |
| 1 | Beamforming report poll (BFRP) |
| 2 | MU-BAR |
| 3 | MU-RTS |
| 4 | Buffer status report poll (BSRP) |
| 5 | GCR MU-BAR |
| 6 | Bandwidth query report poll (BQRP) |
| 7 | Null data packet feedback report poll (NFRP) |
| 8 | EHT MU-RTS |
| 9-15 | Reserved |

As described in Table 1, a new trigger frame structure, for example, an extremely high throughput multi-user request to send (EHT MU-RTS) frame, may be defined. In this case, an EHT MU-RTS type needs to be added to the trigger type field of the common information field. For example, the EHT MU-RTS type is defined on a reserved field whose field value is 8, and then the channel puncture information is carried by the common information field of the newly defined EHT MU-RTS frame.

Optionally, the channel puncture information is carried by the common information field of the newly defined EHT MU-RTS frame. Optionally, the channel puncture information includes a plurality of bits. One value of the plurality of bits indicates at least one type of occupancy of the at least one 20 MHz channel. Alternatively, the channel puncture information is a bitmap. The bitmap includes at least one bit.

One bit corresponds to one 20 MHz channel. The bit indicates whether the 20 MHz channel is occupied. For a specific representation form of the channel puncture information, refer to the foregoing embodiment. Details are not described herein again.

For example, as shown in FIG. 12(A), in the EHT MU-RTS frame, the new field, for example, the EHT channel indication field, is defined in the common information field. The channel indication field carries the channel puncture information. The channel puncture information may be a bitmap. If a value of a bit in the bitmap is 1, it indicates that a channel corresponding to the bit is occupied or punctured. If a value of a bit in the bitmap is 0, it indicates that a channel corresponding to the bit is available or not punctured. 0 or 1 may alternatively indicate opposite cases. A location and a bit quantity that are indicated by the channel are not fixed, and the bit quantity may be 8, or may be another integer. Optionally, another field of the EHT MU-RTS frame and another field of the common information field in FIG. 10 include similar information. Details are not described herein again.

For another example, as shown in FIG. 12(B), the EHT MU-RTS frame, the new field, for example, the EHT puncture type field, is defined in the common information field. The EHT puncture type field carries the channel puncture information. The channel puncture information may be a value. One value corresponds to one puncture type. If the value is 0, it indicates that none of channels is punctured. A location and a bit quantity of the EHT puncture type field are not fixed. The bit quantity may be 2, 3, 7, or 8, or may be another integer. Another field of the EHT MU-RTS frame and another field of the common information field in FIG. 10 include similar information. Details are not described herein again.

Optionally, the common information field further includes bandwidth information. The bandwidth information indicates the bandwidth of the PPDU that carries the MU-RTS frame. The new field, for example, the EHT uplink bandwidth (EHT UL BW) field, may be defined in the common information field of the EHT MU-RTS frame. The EHT uplink bandwidth field carries the bandwidth information. The bandwidth indicated by the bandwidth information may be specifically CBW40, CBW80, CBW160, CBW80+80, CBW240, CBW160+80, CBW320, or CBW160+160. CBW40 indicates that the bandwidth is 40 MHz, CBW80+80 indicates that the bandwidth is double 80 MHz, and others are similar.

As shown in FIG. 13(B), in the newly defined MU-RTS frame, the new field (for example, EHT UL BW) is defined in the common information field to indicate the bandwidth information. An EHT station reads the bandwidth information from the EHT UL BW field. A legacy station still reads the bandwidth information from the UL BW field. A location and a bit quantity of the new field are not fixed. The bit quantity may be 2, 3, or 4, or may be another integer. Another field of the EHT MU-RTS frame and another field of the common information field in FIG. 10 include similar information. Details are not described herein again.

In this embodiment of this application, the channel puncture information carried by the common information field of the newly defined trigger frame indicates channel occupancy in the preamble puncture mode, so that a secondary channel in an idle state can be effectively used. This improves channel protection flexibility and channel resource usage. In addition, if the channel puncture information is carried by the common information field of the trigger frame, different stations may learn channel occupancy from the common information field. This reduces signaling overheads.

Figure 15:
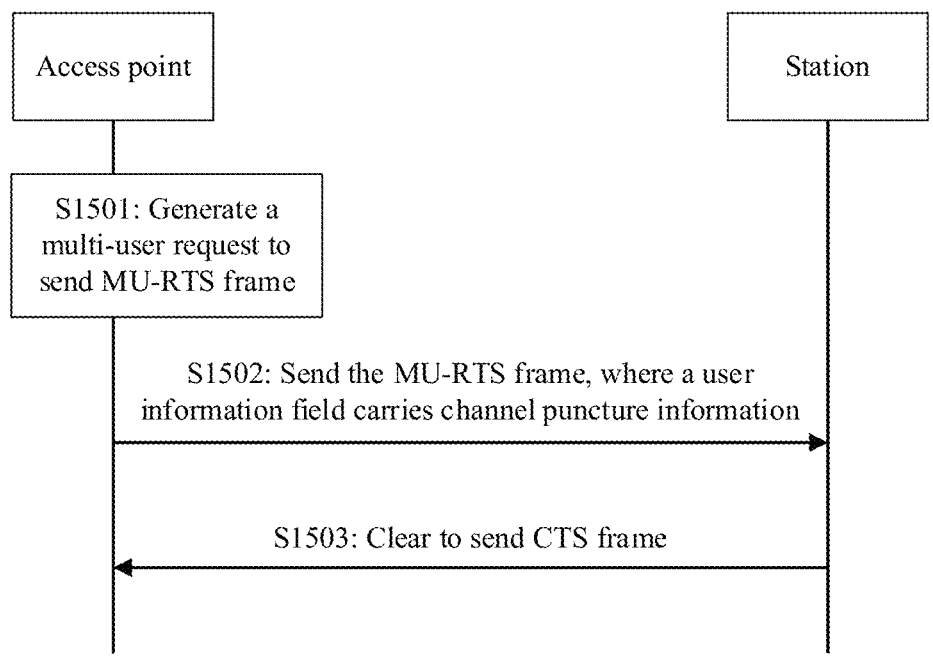
FIG. 15 is a schematic flowchart of another channel puncture mode indication method according to an embodiment of this application.

FIG. 15 is a schematic flowchart of another channel puncture mode indication method according to an embodiment of this application. This embodiment of this application includes the following steps.

S1501: An access point generates an MU-RTS frame, where the MU-RTS frame includes a user information field, and the user information field includes channel puncture information.

Specifically, the user information field of the MU-RTS frame may be modified. One or more fields of the user information field are reused to carry the channel puncture information.

Optionally, the channel puncture information is a bitmap. The bitmap includes at least one bit. One bit corresponds to one 20 MHz channel. The bit indicates whether the 20 MHz channel is occupied.

Figure 16:
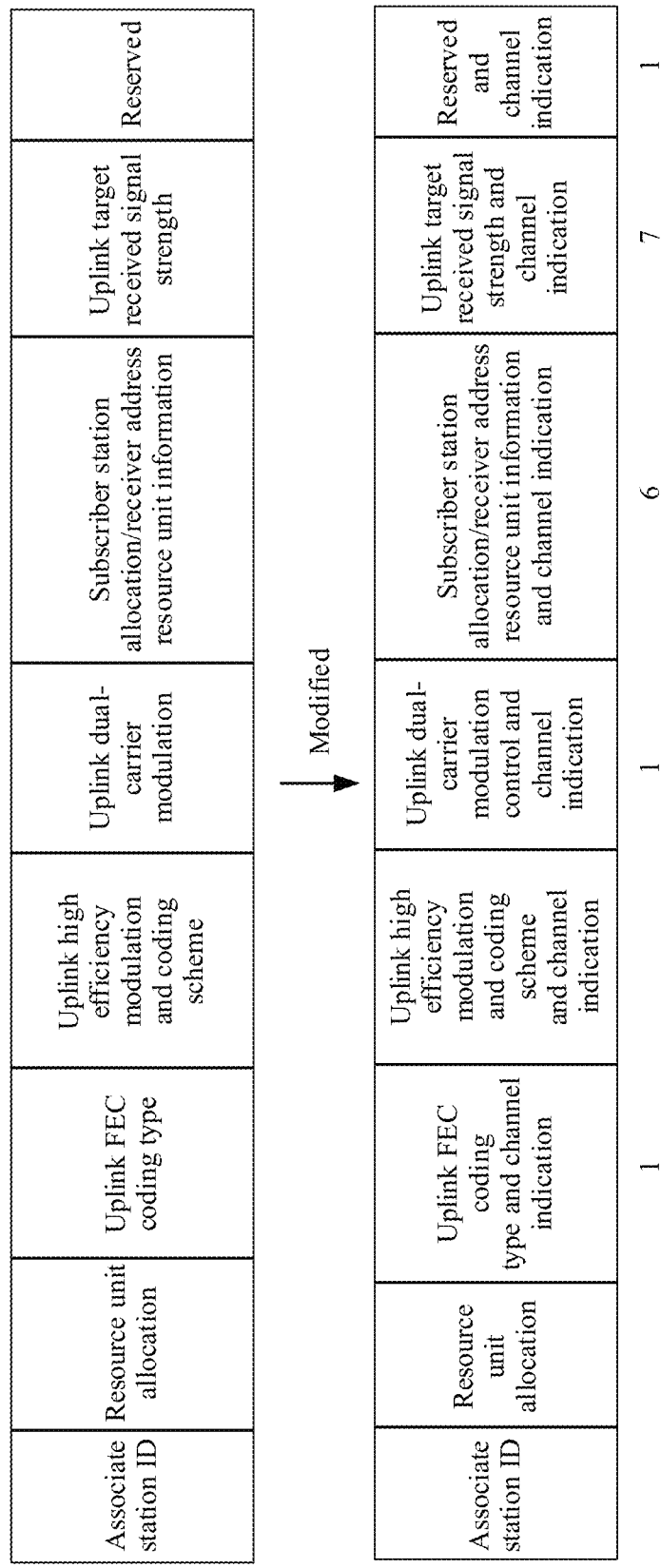
FIG. 16 is a schematic diagram of a user information field according to an embodiment of this application.

FIG. 16 is a schematic diagram of a user information field according to an embodiment of this application. An unmodified user information field includes an associate station ID (AID) field, a resource unit allocation (RU allocation) field, an uplink FEC coding type (UL FEC coding type) field, an uplink high efficiency modulation and coding scheme (UL HE-MCS) field, an uplink dual-carrier modulation (UL DCM) field, a subscriber station allocation/receiver address resource unit information (SS allocation/RA-RU information) field, an uplink target received signal strength indication (UL target RSSI) field, and a reserved field. In a modified user information field, the uplink FEC coding type field, the uplink dual-carrier modulation field, the subscriber station allocation/receiver address resource unit information field, the uplink target received signal strength indication field, and the reserved field are reused to carry a channel indication. The channel indication is a bitmap with 16 bits in total. Each bit corresponds to one 20 MHz channel. If a value of a bit in the bitmap is 1, it indicates that a channel corresponding to the bit is occupied or punctured. If a value of a bit in the bitmap is 0, it indicates that a channel corresponding to the bit is available or not punctured. 0 or 1 may alternatively indicate opposite cases.

Figure 17:
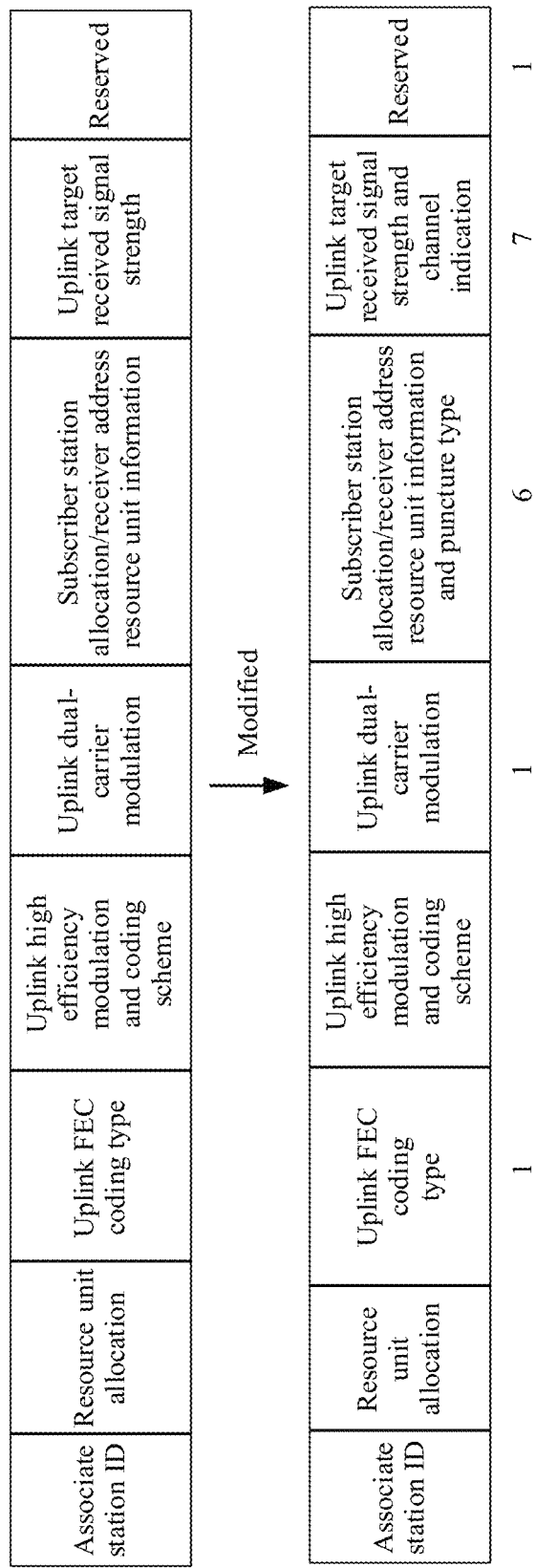
FIG. 17 is a schematic diagram of a user information field according to an embodiment of this application.

Optionally, the channel puncture information includes a plurality of bits. One value of the plurality of bits indicates at least one type of occupancy of the at least one 20 MHz channel. In other words, one value corresponds to one puncture type. For example, FIG. 17 is a schematic diagram of a user information field according to an embodiment of this application. In a modified user information field, the subscriber station allocation/receiver address resource unit information field is reused to indicate a puncture type. One value of the 6 bits corresponds to one puncture type. If the value is 0, it indicates that none of channels is punctured.

For a method for indicating the channel puncture information in S1501, refer to the method for indicating the channel puncture information based on the common information field in S801 in the foregoing embodiment. Details are not described herein again.

S1502: The access point sends the MU-RTS frame to a station, where the channel puncture information indicates whether at least one 20 MHz channel is occupied.

S1503: The station sends a CTS frame to the access point based on the channel puncture information.

For a process of MU-RTS/CTS frame interaction between the access point and the station in S1502 and S1503, refer to the process of MU-RTS/CTS frame interaction between the access point and the station in S802 and S803 in the foregoing embodiment. Details are not described herein again.

Optionally, a common information field of the MU-RTS frame may carry bandwidth information. The bandwidth information indicates a bandwidth of a PPDU that carries the MU-RTS frame. Specifically, a reserved bit in the common information field of the MU-RTS frame may be reused to indicate the bandwidth information. For example, an uplink high efficiency signal A2 field of the common information field carries the bandwidth information. An EHT station reads the bandwidth information from an EHT UL BW field. A legacy station still reads the bandwidth information from a UL BW field.

Optionally, the common information field of the MU-RTS frame may carry an uplink bandwidth UL BW field and additional bandwidth information. The UL BW field and the additional bandwidth information indicate a bandwidth of a PPDU that carries the MU-RTS frame. In other words, for the EHT station, the UL BW field and the additional bandwidth field jointly indicate the bandwidth of the PPDU that carries the MU-RTS frame. The EHT station may read the UL BW field and the additional bandwidth information, for example, an additional bandwidth for EHT (additional BW for EHT) field, to determine the bandwidth of the PPDU that carries the MU-RTS frame. The bandwidth of the PPDU is a sum of a bandwidth value indicated by the UL BW field and a bandwidth value indicated by the additional bandwidth for EHT field.

Specifically, the EHT station may determine the bandwidth of the PPDU by using the following two methods.

In a first method, a value of the UL BW field and a value of the additional BW for EHT field are separately read, and a bandwidth indicated by the UL BW field and a bandwidth indicated by the additional BW for EHT field are determined and added to obtain the bandwidth of the PPDU. If the bandwidth read from the UL BW field is 160 MHz and the bandwidth read from the additional BW for EHT field is 80 MHz, a value of the EHT UL BW field is 240 MHz.

In a second method, a binary value of the UL BW field and a binary value of the additional BW for EHT field are combined and converted into a decimal value, and a bandwidth corresponding to the decimal value is used as the bandwidth of the PPDU. For example, if the binary value of the UL BW field is 11 and the binary value of the additional BW for EHT field is 10, a combined value is 1011 and converted into the decimal value of ii. If the bandwidth corresponding to 11 is 240 MHz or (80 MHz+160 MHz), the bandwidth of the PPDU is 240 MHz or (80 MHz+160 MHz).

Optionally, the common information field further includes indication information. The indication information indicates whether the additional bandwidth information exists. In the MU-RTS frame, the reserved bit in the common information field may be reused to indicate the indication information. For example, an EHT uplink bandwidth indication (EHT UL BW indication) is reused to indicate whether the additional bandwidth information exists. If the EHT UL BW indication is 1, it indicates that the additional bandwidth information field exists, and the station needs to read the additional BW for EHT field. If the indication information is 0, it indicates that no additional bandwidth information field exists, and the station does not need to read the additional BW for EHT field. 0 or 1 may alternatively indicate opposite cases. If the indication information value is 0, the EHT station or the legacy station only needs to read the bandwidth information from the UL BW field. If the indication information is 1, the legacy station only needs to read the bandwidth information from the UL BW field, and the EHT station needs to read the bandwidth information from the UL BW field and the additional BW for EHT field. Therefore, capability of the legacy station is ensured.

In this embodiment of this application, the user information field of the MU-RTS frame is reused to indicate the channel puncture information, so that different stations can learn the channel puncture information, and no additional bit needs to be added. This reduces signaling overheads. In addition, the channel puncture information indicates channel occupancy in a preamble puncture mode, so that a secondary channel in an idle state can be effectively used. This improves channel protection flexibility and channel resource usage.

Figure 18:
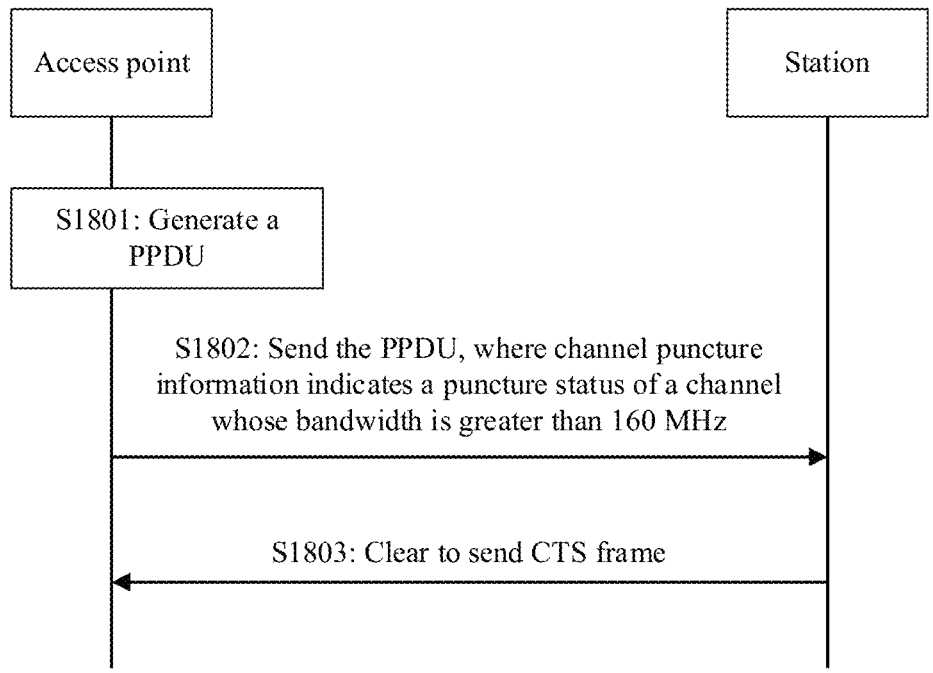
FIG. 18 is a schematic flowchart of another channel puncture mode indication method according to an embodiment of this application.

FIG. 18 is a schematic flowchart of another channel puncture mode indication method according to an embodiment of this application. This embodiment of this application includes the following steps.

S1801: An access point generates a physical layer protocol data unit PPDU, where the PPDU includes a bandwidth field, and the bandwidth field includes channel puncture information.

The PPDU may include an EHT MU PPDU and an EHT single-user (SU) PPDU. The channel puncture information may be carried by the EHT MU PPDU or the EHT SU PPDU. The channel puncture information indicates a puncture status of a channel whose bandwidth is greater than 160 MHz. In an example, the channel puncture information is a bitmap. The bitmap includes at least one bit. One bit corresponds to one 20 MHz channel. The bit indicates whether the 20 MHz channel is occupied. In another example, the channel puncture information includes a plurality of bits. One value of the plurality of bits indicates at least one type of occupancy of the at least one 20 MHz channel. In other words, one value corresponds to one puncture type.

For a method for indicating the channel puncture information in this step, refer to the method for indicating the channel puncture information in S801 in the foregoing embodiment. Details are not described herein again.

Optionally, the PPDU carries an RTS frame or an MU-RTS frame.

S1802: The access point sends the PPDU to a station, where the channel puncture information indicates the puncture status of the channel whose bandwidth is greater than 160 MHz.

S1803: The station sends a CTS frame to the access point based on the channel puncture information.

It should be noted that if the station receives the RTS frame or the MU-RTS frame carried by the PPDU, and a bandwidth field of the PPDU that carries the RTS frame or the MU-RTS frame indicates the channel puncture information, the station is allowed to reply with the CTS frame only on a 20 MHz channel that is not punctured.

For a process of MU-RTS/CTS frame interaction between the access point and the station in S1802 and S1803, refer to the process of MU-RTS/CTS frame interaction between the access point and the station in S802 and S803 in the foregoing embodiment. Details are not described herein again.

In this embodiment of this application, the bandwidth field of the PPDU indicates the channel puncture information, and a trigger frame structure does not need to be modified. This implements high backward compatibility. In addition, the channel puncture information indicates channel occupancy in a preamble puncture mode, so that a secondary channel in an idle state can be effectively used. This improves channel protection flexibility and channel resource usage.

Figure 23:
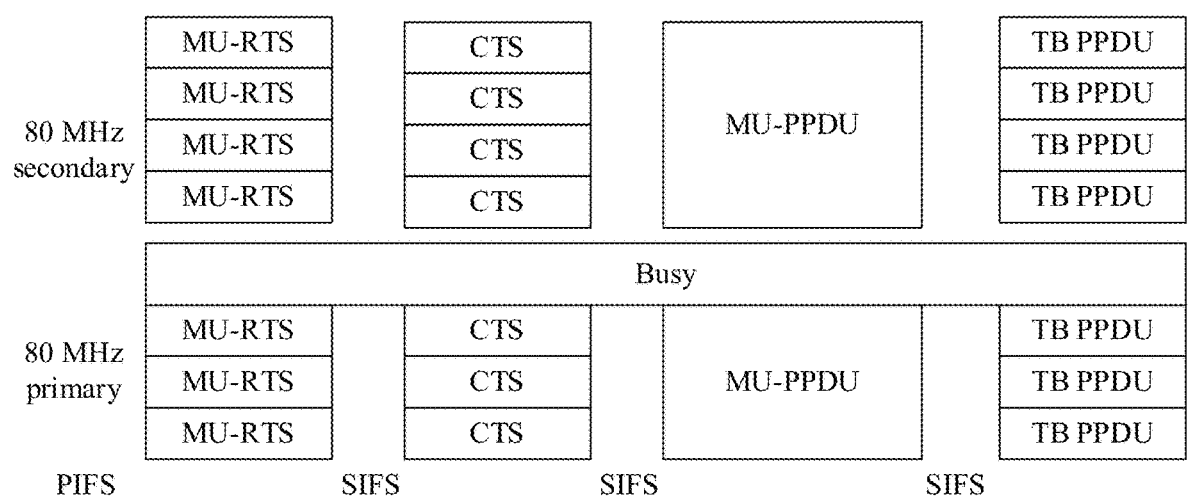
FIG. 23 is a schematic flowchart of channel protection according to an embodiment of this application.

FIG. 23 is a schematic flowchart of channel protection according to an embodiment of this application. Specifically, after obtaining primary channel access permission supported by a current device, the access point uses a PIFS channel access manner in the bandwidth supported by the device, namely, waits for PIFS time and performs energy detection, to determine an accessible secondary channel from all secondary channels. The access point sends the MU-RTS frame on the primary channel and the accessible secondary channel. The MU-RTS frame carries the channel puncture information. The channel puncture information indicates channel occupancy of a receive end in a preamble puncture mode, namely, which channels are available and which channels are unavailable (the fourth 20 MHz channel in the figure is punctured and unavailable). In the puncture mode, an 80 MHz secondary channel is also an available channel. The access point sets a NAV on these available channels from a perspective of a transmit end. After receiving the MU-RTS frame, the receive end replies with a CTS frame on the available channels, sets a NAV for these available channels from a perspective of the receive end, and protects these available channels, so that the first 60 MHz channel of an 80 MHz primary channel is protected, the 80 MHz secondary channel is also protected, and a secondary channel in an idle state can be used. This improves channel protection flexibility and channel usage. Finally, the access point sends an MU-PPDU to one or more stations or schedules a station to send a TB PPDU on a protected channel. If channel protection is performed by using the existing 802.11ax protocol, because the fourth 20 MHz channel is in a busy state, the access point can send the MU-RTS frame only on the first 40 MHz channel of the 80 MHz primary channel. As a result, the fourth 20 MHz channel and the 80 MHz secondary channel cannot be protected, and an idle secondary channel cannot be used. This means low channel protection flexibility and low spectrum efficiency. Therefore, according to the technical solution provided in this embodiment of this application, when a bandwidth is large (for example, 320 MHz) and a channel is discontinuously occupied, channel protection flexibility can be greatly improved, so that an idle discontinuous channel is protected for transmission. This improves idle channel usage.

Figure 19:
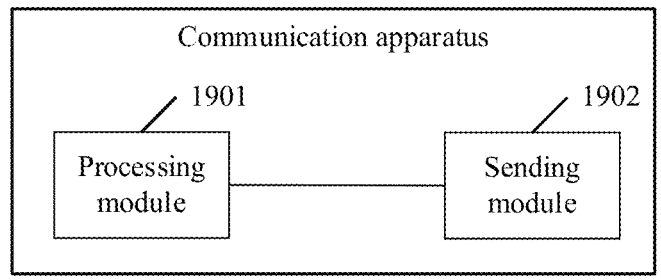
FIG. 19 is a schematic diagram of a structure of a communication apparatus according to an embodiment of this application.

FIG. 19 is a schematic diagram of a structure of a communication apparatus according to an embodiment of this application. The communication apparatus may be an access point, or a chip or a processing system in an access point. The apparatus may be configured to implement any method and function of the access point in any one of the foregoing embodiments. The apparatus may include a processing module 1901 and a sending module 1902. Optionally, the sending module 1902 corresponds to one radio frequency circuit and one baseband circuit that are included in the access point. The modules are described in detail as follows:

The processing module 1901 is configured to generate a multi-user request to send MU-RTS frame. The MU-RTS frame includes a common information field. The common information field includes channel puncture information.

The sending module 1902 is configured to send the MU-RTS frame to a station. The channel puncture information indicates whether at least one 20 MHz channel is occupied.

The processing module 1901 and the sending module 1902 may be modules in the foregoing access point. For content and functions of elements or fields included in the MU-RTS frame, refer to descriptions in the foregoing method embodiments. Details are not described herein again.

It should be noted that, for implementation of the modules, refer to corresponding descriptions of the method embodiments shown in FIG. 8, FIG. 15, and FIG. 18. The modules perform the methods and the functions performed by the access point in the foregoing embodiments.

Figure 20:
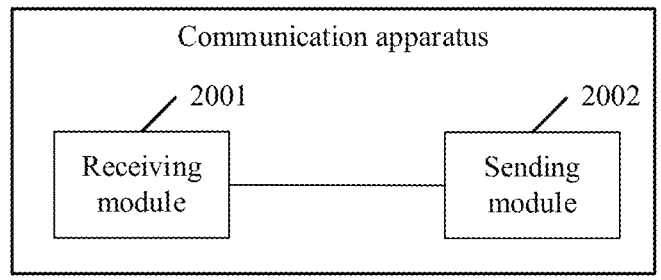
FIG. 20 is a schematic diagram of a structure of a communication apparatus according to an embodiment of this application.

FIG. 20 is a schematic diagram of a structure of a communication apparatus according to an embodiment of this application. The communication apparatus may be a station, or a chip or a processing system in a station. The apparatus may be configured to implement any method and function of the station in any one of the foregoing embodiments. The apparatus may include a receiving module 2001 and a sending module 2002. Optionally, the receiving module 2001 and the sending module 2002 correspond to one radio frequency circuit and one baseband circuit included in the station respectively. The modules are described in detail as follows:

The receiving module 2001 is configured to receive a multi-user request to send MU-RTS frame from an access point. The MU-RTS frame includes a common information field. The common information field includes channel puncture information. The channel puncture information indicates whether at least one 20 MHz channel is occupied.

The sending module 2002 is configured to send a clear to send CTS frame to the access point based on the channel puncture information.

The receiving module 2001 and the sending module 2002 may be modules in the foregoing station. For content and functions of elements or fields included in the MU-RTS frame, refer to descriptions in the foregoing method embodiments. Details are not described herein again.

It should be noted that, for implementation of the modules, refer to corresponding descriptions of the method embodiments shown in FIG. 8, FIG. 15, and FIG. 18. The modules perform the methods and the functions performed by the station in the foregoing embodiments.

Figure 21:
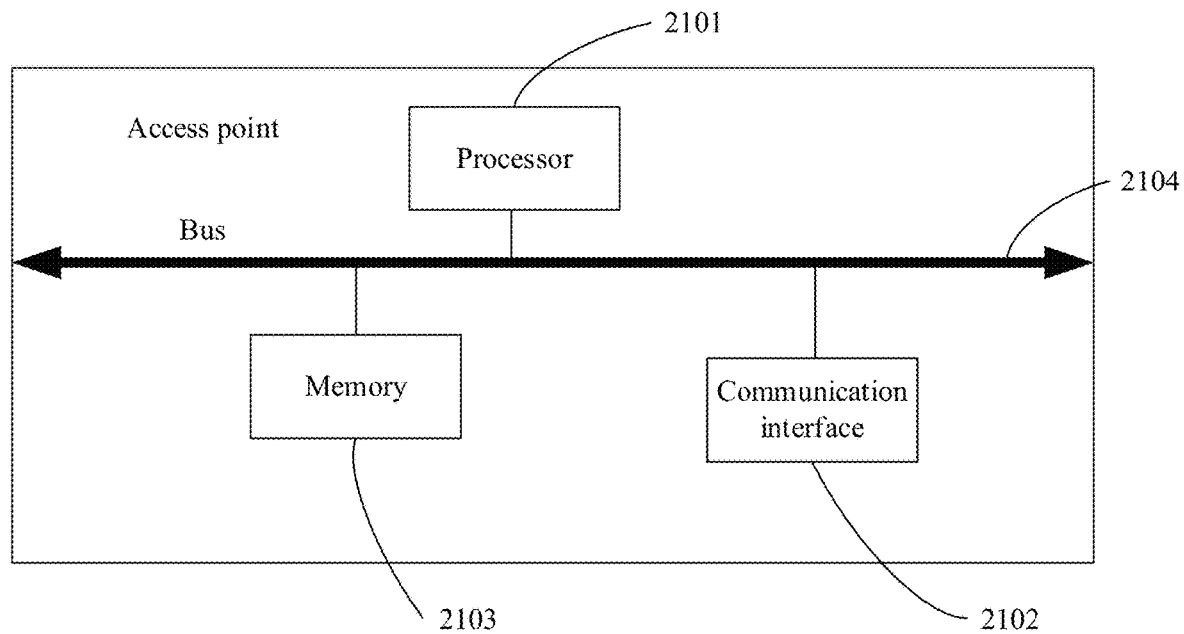
FIG. 21 is a schematic diagram of a structure of an access point according to an embodiment of this application.

FIG. 21 is a schematic diagram of a structure of an access point according to an embodiment of this application. As shown in FIG. 21, the access point may include at least one processor 2101, at least one communication interface 2102, at least one memory 2103, and at least one communication bus 2104.

The processor 2101 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus 2104 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 21, but this does not mean that there is only one bus or only one type of bus. The communication bus 2104 is configured to implement connection and communication between these components. The communication interface 2102 in the device in this embodiment of this application is configured to perform signaling or data communication with another node device. The memory 2103 may include a volatile memory, for example, a nonvolatile dynamic random access memory (NVRAM), a phase-change random access memory (PRAM), or a magnetoresistive random access memory (MRAM). The memory may further include a nonvolatile memory, for example, at least one magnetic disk storage device, an electrically erasable programmable read-only memory (EEPROM), a flash storage device such as a NOR flash memory or a NAND flash memory, or a semiconductor device such as a solid-state drive (SSD). Optionally, the memory 2103 may alternatively be at least one storage apparatus located far away from the processor 2101. Optionally, the memory 2103 may further store a group of program code. Optionally, the processor 2101 may further execute a program stored in the memory 2103.

A multi-user request to send MU-RTS frame is generated. The MU-RTS frame includes a common information field. The common information field includes channel puncture information.

The MU-RTS frame is sent to a station. The channel puncture information indicates whether at least one 19 MHz channel is occupied.

For content and functions of elements or fields included in the MU-RTS frame, refer to descriptions in the foregoing method embodiments. Details are not described herein again.

Further, the processor may further cooperate with the memory and the communication interface, to perform an operation of the access point in the foregoing embodiments of this application.

Figure 22:
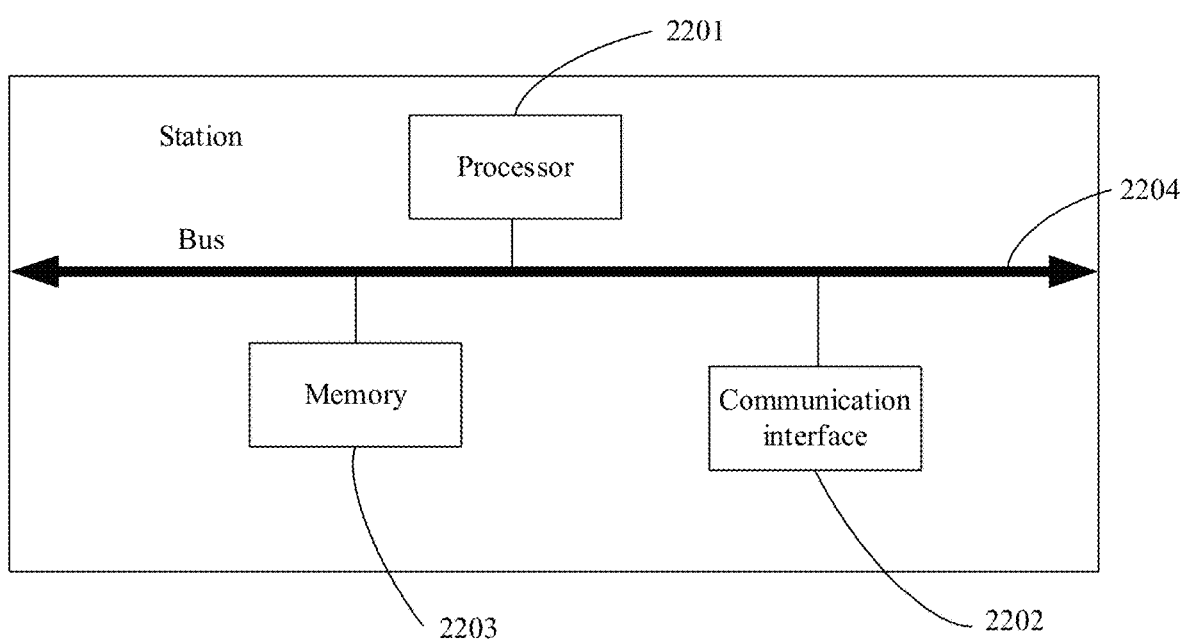
FIG. 22 is a schematic diagram of a structure of a station according to an embodiment of this application.

FIG. 22 is a schematic diagram of a structure of a station according to an embodiment of this application. As shown in the figure, the station may include at least one processor 2201, at least one communication interface 2202, at least one memory 2203, and at least one communication bus 2204.

The processor 2201 may be processors of various types mentioned above. The communication bus 2204 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 22, but this does not mean that there is only one bus or only one type of bus. The communication bus 2204 is configured to implement connection and communication between these components. The communication interface 2202 in the device in this embodiment of this application is configured to perform signaling or data communication with another node device. The memory 2203 may be memories of various types mentioned above. Optionally, the memory 2203 may alternatively be at least one storage apparatus far away from the processor 2201. The memory 2203 stores a group of program code, and the processor 2201 executes a program in the memory 2203.

A multi-user request to send MU-RTS frame is received from an access point. The MU-RTS frame includes a common information field. The common information field includes channel puncture information. The channel puncture information indicates whether at least one 20 MHz channel is occupied.

A clear to send CTS frame is sent to the access point based on the channel puncture information.

For content and functions of elements or fields included in the MU-RTS frame, refer to descriptions in the foregoing method embodiments. Details are not described herein again.

Further, the processor may further cooperate with the memory and the communication interface, to perform an operation of the access point in the foregoing embodiments of this application.

An embodiment of this application further provides a chip system. The chip system includes a processor, configured to support an access point or a station in implementing a function in any one of the foregoing embodiments, for example, generating or processing an MU-RTS frame and/or a CTS frame in the foregoing method. In a possible design, the chip system may further include a memory. The memory is configured to store program instructions and data that are required by the access point or the station. The chip system may include a chip, or may include a chip and another discrete component.

An embodiment of this application further provides a processor. The processor is coupled to a memory, and is configured to perform any method and function of an access point of a station in any one of the foregoing embodiments.

An embodiment of this application further provides a computer program product including instructions. When the computer program product runs on a computer, the computer is enabled to perform any method and function of an access point or a station in any of the foregoing embodiments.

An embodiment of this application further provides an apparatus, configured to perform any method and function of an access point or a station in any one of the foregoing embodiments.

An embodiment of this application further provides a wireless communication system. The system includes at least one access point and at least one station in any one of the foregoing embodiments.

All or a part of the foregoing embodiments may be implemented by using software, hardware, firmware, or any combination thereof. When software is used for implementing embodiments, all or a part of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A method, comprising:
generating, by an access point, a multi-user request to send (MU-RTS) frame, wherein the MU-RTS frame comprises a common information field, and the common information field comprises channel puncture information;
sending, by the access point, the MU-RTS frame to a station, wherein the channel puncture information indicates whether at least one 20 MHz channel is occupied based on energy detection of the at least one 20 MHz channel; and
after sending the MU-RTS frame including the channel puncture information, receiving, by the access point, a clear to send (CTS) frame,
wherein the channel puncture information indicates whether the at least one 20 MHz channel is occupied in a preamble puncture mode,
wherein the common information field further comprises an uplink (UL) bandwidth (BW) field, additional bandwidth information, and a bit field indicating existence of the additional bandwidth information, and
wherein a trigger type field of the MU-RTS frame indicates a reserved value, and the reserved value is any one value from 8 to 10 or 12 to 15.

2. The method according to claim 1, wherein the channel puncture information includes a bitmap, the bitmap comprises at least one bit, and each bit of the at least one bit corresponds to a corresponding 20 MHz channel and indicates whether the corresponding 20 MHz channel is occupied.

3. The method according to claim 1, wherein the channel puncture information comprises a plurality of bits, and a value of the plurality of bits indicates at least one type of occupancy of the at least one 20 MHz channel.

4. The method according to claim 1, wherein the channel puncture information is carried by a UL spatial reuse field of the common information field or a transmit power field of the common information field.

5. The method according to claim 1, wherein the common information field further comprises bandwidth information, and wherein the bandwidth information indicates a bandwidth of a physical layer protocol data unit (PPDU) that carries the MU-RTS frame.

6. The method according to claim 5, wherein the bandwidth information is carried by a UL high efficiency signal A2 field of the common information field.

7. The method according to claim 1, wherein the UL BW field and the additional bandwidth information indicate a bandwidth of a PPDU that carries the MU-RTS frame.

8. The method according to claim 5, wherein the bandwidth comprises: 240 MHZ, 160 MHz+80 MHZ, 320 MHz, or 160 MHz+160 MHz.

9. An apparatus, comprising:
a memory storing computer instructions; and
at least one processor, configured to execute the computer instructions to cause the apparatus to:
generate a multi-user request to send (MU-RTS) frame, wherein the MU-RTS frame comprises a common information field, and the common information field comprises channel puncture information;
send the MU-RTS frame to a station, wherein the channel puncture information indicates whether at least one 20 MHz channel is occupied based on energy detection of the at least one 20 MHz channel; and
after sending the MU-RTS frame including the channel puncture information, receive a clear to send (CTS) frame,
wherein the channel puncture information indicates whether the at least one 20 MHz channel is occupied in a preamble puncture mode,
wherein the common information field further comprises an uplink (UL) bandwidth (BW) field, additional bandwidth information, and a bit field indicating existence of the additional bandwidth information, and
wherein a trigger type field of the MU-RTS frame indicates a reserved value, and the reserved value is any one value from 8 to 10 or 12 to 15.

10. The apparatus according to claim 9, wherein the channel puncture information includes a bitmap, the bitmap comprises at least one bit, and each bit of the at least one bit corresponds to a corresponding 20 MHz channel and indicates whether the corresponding 20 MHz channel is occupied.

11. The apparatus according to claim 9, wherein the channel puncture information comprises a plurality of bits, and a value of the plurality of bits indicates at least one type of occupancy of the at least one 20 MHz channel.

12. The apparatus according to claim 9, wherein the channel puncture information is carried by a UL spatial reuse field of the common information field or a transmit power field of the common information field.

13. The apparatus according to claim 9, wherein the common information field further comprises bandwidth information, and wherein the bandwidth information indicates a bandwidth of a physical layer protocol data unit (PPDU) that carries the MU-RTS frame.

14. The apparatus according to claim 13, wherein the bandwidth information is carried by a UL high efficiency signal A2 field of the common information field.

15. The apparatus according to claim 9, wherein the UL BW field and the additional bandwidth information indicate a bandwidth of a PPDU that carries the MU-RTS frame.

16. The apparatus according to claim 13, wherein the bandwidth comprises: 240 MHz, 160 MHz+80 MHz, 320 MHz, or 160 MHz+160 MHz.

* * * * *

UNITED STATES PATENT AND TRADEMARK OFFICE
CERTIFICATE OF CORRECTION

PATENT NO. : 12,389,454 B2  
APPLICATION NO. : 17/966046  
DATED : August 12, 2025  
INVENTOR(S) : Yang et al.

Page 1 of 1

It is certified that error appears in the above-identified patent and that said Letters Patent is hereby corrected as shown below:

In the Claims

In Column 25, in Claim 8, Line 55, delete "240 MHZ, 160 MHz+80 MHZ," and insert -- 240 MHz, 160 MHz+80 MHz, --.

In Column 25, in Claim 1, Line 16, delete "after sending" and insert -- after the sending --.

Signed and Sealed this  
Twenty-first Day of October, 2025

John A. Squires  
*Director of the United States Patent and Trademark Office*